(12) United States Patent
Aizawa et al.

(10) Patent No.: US 7,813,859 B2
(45) Date of Patent: Oct. 12, 2010

(54) AUTOMATIC BRAKING DEVICE FOR CONTROLLING MOVEMENT OF VEHICLE IN UNINTENDED DIRECTION OF THE DRIVER WITH TARGET BRAKE DECREASING CONTROL

(75) Inventors: Hiroaki Aizawa, Anjo (JP); Shinsuke Sakane, Handa (JP); Masashi Kishimoto, Chiryu (JP); Yuzo Imoto, Chita-gun (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 11/987,039

(22) Filed: Nov. 27, 2007

(65) Prior Publication Data
US 2008/0319624 A1 Dec. 25, 2008

Related U.S. Application Data

(62) Division of application No. 10/627,746, filed on Jul. 28, 2003, now Pat. No. 7,317,980.

(30) Foreign Application Priority Data

Jul. 30, 2002 (JP) ............................. 2002-221397

(51) Int. Cl.
*G06F 19/00* (2006.01)
*B60T 7/12* (2006.01)

(52) U.S. Cl. .................. 701/70; 701/48; 701/93; 701/96; 180/281; 180/282; 192/219; 192/219.1; 192/220.1; 303/3; 477/92; 477/94; 477/95; 477/96

(58) Field of Classification Search .......... 180/281, 180/282; 192/219, 219.1, 220.1; 303/3; 477/92, 94, 95, 96; 701/48, 70, 93, 96
See application file for complete search history.

(56) References Cited

U.S. PATENT DOCUMENTS 4,629,043 A * 12/1986 Matsuo et al. ............... 477/184

(Continued)

FOREIGN PATENT DOCUMENTS

| JP | U-55-071962 | 11/1953 |
| JP | A-06-010723 | 1/1994 |
| JP | A-06-264783 | 9/1994 |
| JP | A-07-125622 | 5/1995 |
| JP | A-08-282456 | 10/1996 |
| JP | A-08-324397 | 12/1996 |
| JP | A-10-016745 | 1/1998 |
| JP | A-11-048822 | 2/1999 |

OTHER PUBLICATIONS

Office Action dated Oct. 15, 2008 in corresponding Japanese patent application No. 2003-276721 (and English translation).

*Primary Examiner*—Thomas G Black
*Assistant Examiner*—Sze-Hon Kong
(74) *Attorney, Agent, or Firm*—Posz Law Group, PLC

(57) ABSTRACT

When a vehicle stops, a brake control unit maintains a braking force applied on a wheel by a braking-force application unit for maintaining a halted state. In this state, if a driver depresses the accelerator pedal to execute starting of the vehicle, the braking force is gradually decreased, and the vehicle starts at a speed that accords with a degree of accelerator opening and a gradient of a road on which the vehicle is stopped. When a movement direction at this time is the same as a movement direction intended by the driver, the braking force is decreased to zero for smooth starting. When the movement direction is opposite to the intended movement direction, the braking force is increased to control the movement in the opposite direction, such that the movement changes from the opposite direction to the same direction, and finally, smooth starting in the desired direction is executed.

3 Claims, 18 Drawing Sheets

U.S. PATENT DOCUMENTS

| | | | |
|---|---|---|---|
| 4,676,354 A * | 6/1987 | Janiszewski et al. | 477/92 |
| 4,717,207 A * | 1/1988 | Kubota et al. | 303/3 |
| 5,731,977 A * | 3/1998 | Taniguchi et al. | 701/96 |
| 5,875,766 A | 3/1999 | Ozawa | |
| 5,902,345 A * | 5/1999 | Minowa et al. | 701/96 |
| 5,911,646 A * | 6/1999 | Tsutsui et al. | 477/93 |
| 5,916,062 A * | 6/1999 | Siepker | 477/194 |
| 5,935,041 A * | 8/1999 | Tsukamoto et al. | 477/92 |
| 6,246,944 B1 * | 6/2001 | Maruyama | 701/70 |
| 6,253,144 B1 * | 6/2001 | Yamamura et al. | 701/96 |
| 6,644,454 B2 * | 11/2003 | Yamada et al. | 192/219.1 |
| 6,814,414 B1 * | 11/2004 | Schmitt et al. | 303/191 |
| 6,843,754 B2 * | 1/2005 | Mori et al. | 477/92 |

* cited by examiner

AUTOMATIC BRAKING DEVICE FOR CONTROLLING MOVEMENT OF VEHICLE IN UNINTENDED DIRECTION OF THE DRIVER WITH TARGET BRAKE DECREASING CONTROL

CROSS REFERENCE TO RELATED APPLICATION

This application is a division of application Ser. No. 10/627,746 filed on Jul. 28, 2003, which is based upon and claims the benefit of Japanese Patent Application No. 2002-221397 filed on Jul. 30, 2002, the contents of which are incorporated herein by reference.

FIELD OF THE INVENTION

The present invention relates to an automatic brake device that controls a braking force regardless of a driver's depression of the brake pedal. The invention is preferably applied to an automatic brake device that increases or decreases braking force in order to execute smooth starting operation, when vehicle starting is executed on the basis of the driver's starting intention.

RELATED ART OF THE INVENTION

Conventionally, an automatic brake device controls a driving torque of a vehicle when starting so as to make the driving torque slightly higher than a running resistance torque, in order to prevent backward movement of the vehicle when starting uphill (such as disclosed in Japanese Patent Laid-Open Publication No. 06-264783). In this case, determination of a target driving torque requires detection of the running resistance torque. This leads to a problem since it is necessary to quantitatively detect or estimate the gradient of the hill.

SUMMARY OF THE INVENTION

The present invention has been made in light of the above problem and it is an object thereof to provide control of a braking force without detection or estimation of a gradient of a sloping road, in order to realize a smooth starting operation.

According to the present invention, when operation based on an intention of a driver to execute starting of a vehicle is performed for a vehicle that is maintained in a halted state by a halt-maintenance braking force applied to the wheels thereof, a braking force is controlled on the basis of a relationship between an actual movement direction and an intended movement direction. The actual movement direction is the direction in which the vehicle actually moves, and the intended movement direction is the direction in which the driver intends to move the vehicle.

Therefore, by decreasing or increasing the braking force in accordance with whether the actual movement direction and the intended movement direction are the same direction or opposite directions, it is possible to execute smooth starting of the vehicle in the intended movement direction, in accordance with the driver's starting intention. This eliminates the need for detection or estimation of a gradient angle of the sloping road.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
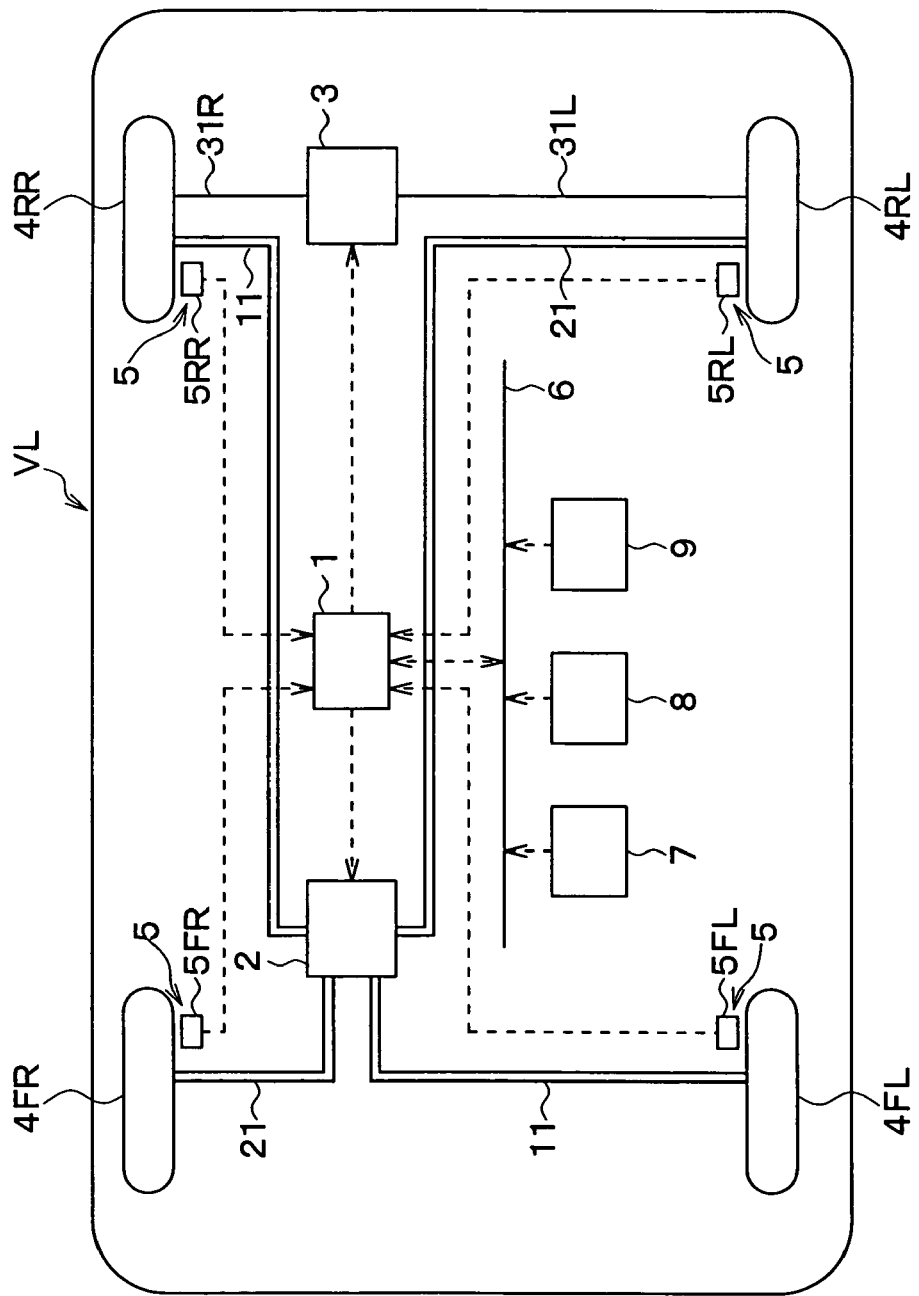
FIG. 1 is a diagram illustrating an entire structure of an automatic brake device of a first embodiment according to the present invention.

The present invention will be described further with reference to various embodiments in the drawings.

First Embodiment

A description will first be given of an automatic brake device of a first embodiment according to the present invention with reference to the accompanying drawings. FIG. 1 illustrates an entire structure of the automatic brake device of the first embodiment, in which a front right wheel, front left wheel, rear right wheel and rear left wheel of a vehicle VL are respectively designated as FR, FL, RR, and RL.

All elements of the automatic brake device described in the first embodiment are mounted in the vehicle VL. The automatic brake device includes a brake control ECU 1 serving as a brake control unit; a hydraulic braking apparatus 2 serving as a first brake unit; an electrically-actuated parking brake (hereinafter referred to as "PKB") 3 serving as a second brake unit; and wheel cylinders (hereinafter referred to as "W/C") 41FR, 41RL, 41FL, and 41RR. These W/Cs 41FR, 41RL, 41FL, and 41RR are respectively provided in the corresponding wheels 4FR, 4RL, 4FL and 4RR, and are diagonally connected to the hydraulic braking apparatus 2 through a first braking circuit 11 and a second braking circuit 21. Further, brake wires 31R, 31L are respectively provided between the PKB 3 and the rear wheels 4RL and 4RR, thus connecting the PKB 3 with each brake caliper (not shown) of the respective rear wheels 4RL and 4RR.

Further, the automatic brake device includes wheel speed sensors 5, an in-vehicle LAN bus 6, an accelerator pedal operation amount sensor 7, a shift position sensor 8, and a backward-and-forward acceleration sensor 9. The wheel speed sensors 5 detect rotational speeds and rotational directions of respective wheels. The in-vehicle LAN bus 6 transmits an input signal and an output signal to and from each of various electronic instruments. The accelerator pedal operation amount sensor 7 detects an operation amount an accelerator pedal (not shown). The shift position sensor 8 detects a shift position of an automatic transmission (not shown). The backward-and-forward acceleration sensor 9 detects acceleration in a backward-and-forward direction of the vehicle VL.

Next, details of each element of the automatic brake device will be described.

The brake control ECU 1 is configured from a computer. The brake control ECU 1 receives wheel speed from the wheel speed signals from the wheel speed sensors 5. The brake control ECU 1 also receives an accelerator pedal operation amount signal from the accelerator pedal operation amount sensor 7, a shift position signal from the shift position sensor 8 and a backward-and-forward acceleration signal from the backward-and-forward acceleration sensor 9 via the in-vehicle LAN bus 6. Then, based on each of the above input signals, the brake control ECU 1 follows a procedure of a control flow diagram, described hereinafter, in order to determine and output an actuating signal (a first actuating signal or a second actuating signal) for controlling the hydraulic braking apparatus 2 and the PKB 3 that serve as a braking-force application unit. Accordingly, braking force is generated on each wheel.

Furthermore, in the following description, the term "braking pressure" is equivalent to a W/C pressure causing generation of "braking force", and thus corresponds to the term "braking force". For example, a target deceleration corresponding to a target braking force is converted to a braking pressure on the basis of an equation of deceleration, 1 G=10 MPa (where, G is a gravitational acceleration and Pa is a Pascal (unit of pressure)). Note that, the above equation is defined since: Pa is a Pascal indicating a unit of pressure and 1 MPa of the W/C pressure is, for example, equivalent to 0.1 G (gravitational acceleration) of deceleration.

Figure 2:
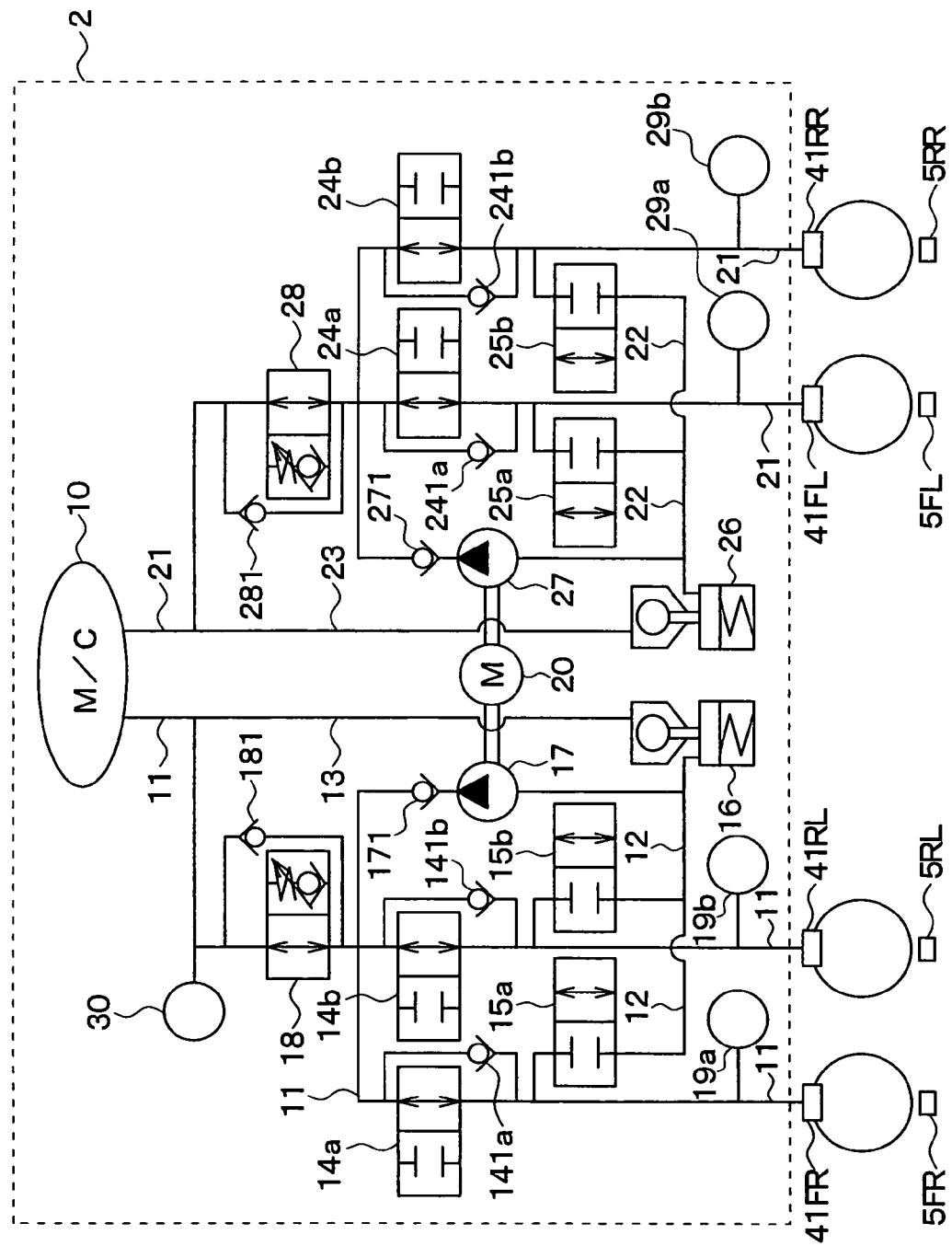
FIG. 2 is a diagram illustrating the structure of a hydraulic braking apparatus according to the first embodiment.

The hydraulic braking apparatus 2 is configured as illustrated in FIG. 2. When the vehicle driver depresses a brake pedal (not shown), a master cylinder (hereinafter referred to as "M/C") 10 produces an M/C pressure corresponding to a depression force. The M/C pressure is transmitted to the W/Cs 41FR, 41RL, 41FL, and 41RR provided in the respective wheels via the corresponding first braking circuit 11 and the second braking circuit 21, in order to generate a first braking force. Next, the first braking circuit 11 will be described, with particular emphasis on the braking circuit relating to the front right wheel 4FR. However, the same description applies to the other wheels of the first braking circuit 11 and the second braking circuit 21.

The first braking circuit 11 includes pressure increase control valves 14*a* and 14*b* provided for the front right wheel 4FR and the rear left wheel 4RL. The pressure increase control valves 14*a* and 14*b* adjust pressure increase and the pressure maintenance for the respective W/Cs 41FR and 41RL in an anti skid control (hereinafter referred to as "ABS control"). Further, the pressure increase control valves 14*a* and 14*b* are arranged in parallel with check valves 141*a* and 141*b*, respectively, in order to allow fluid flow to be directed toward the M/C 10 if the W/C pressure is excessive during the closure of each of the pressure increase control valves 14*a* and 14*b*. Pressure decrease control valves 15*a* and 15*b* are provided in a pressure decrease line 12 extending from a point between the pressure increase control valves 14*a* and 14*b* and the W/Cs 41FR and 41RL. These pressure decrease control valves 15*a* and 15*b* adjust pressure decrease and pressure maintenance of the W/Cs 41FR and 41RL in the ABS control.

The pressure decrease line 12 is connected to a reservoir 16. The reservoir 16 stores brake fluid and has a check valve for adjusting a brake fluid pressure therein. This brake fluid is sucked up by a pump 17 driven by a motor 20, and then discharged into the first braking circuit 11. The discharge destination is a point between the pressure increase control valves 14*a* and 14*b* and a cut off valve (hereinafter referred to as "SM valve") 18. The motor 20 also drives a pump 27 in the second braking circuit 21. Further, a check valve 171 is provided in the outlet of the pump 17.

The SM valve 18 is disposed between the M/C 10 and the pressure increase control valves 14*a* and 14*b*. The SM valve 18 is a two-position valve that is in an opened state when non-energized, and is in a closed state when energized, due to a check valve positioned in the direction shown in FIG. 2. In the closed state, the fluid pressure in the W/Cs 41FR and 41RL is released when it is higher than the pressure in the M/C 10 by the amount of a component of pressure caused by the spring of the check valve. Accordingly, a fluid pressure release structure is realized. The SM valve 18 is arranged in parallel with a check valve 181, and as a result only flow from the M/C 10 toward the W/Cs 41FR and 41RL is permitted.

A suction line 13 establishes a connection between the reservoir 16 and a point between the M/C 10 and the SM valve 18.

A fluid-pressure sensor 30 for detection of pressure produced in the M/C 10 is provided between the M/C 10 and the SM valve 18 in the first braking circuit 11. The pressure detected by the sensor 30 is a pressure produced in a secondary chamber (not shown) of the M/C 10. It should be noted that, the same pressure is produced in a primary chamber thereof, which is connected to the second braking circuit. Hence, the fluid-pressure sensor 30 substantially detects the M/C pressure. Further, fluid-pressure sensors 19*a* and 19*b* for detection of each W/C pressure are respectively provided between the pressure increase control valve 14*a* and the W/C 41FR, and between the pressure increase control valve 14*b* and the W/C 41RL. The output signals from these fluid-pressure sensors 30, 19*a* and 19*b* are input to the brake control ECU 1.

Each of the above pressure increase control valves 14*a* and 14*b* and the pressure decrease control valves 15*a* and 15*b* is a two-position valve, which is in the valve position illustrated in FIG. 2 when non-energized (i.e., OFF), such as when the brake pedal is not applied, or during normal braking operation, or the like. In other words, when non-energized, the pressure increase valve is in the opened state and the pressure decrease valve is in the closed (cut-off) state. Further, during normal non-energized time periods, the SM valve 18 is in the valve position illustrated in FIG. 2, i.e., the opened state. Each of the above control valves is operated by an actuating signal supplied from the brake control ECU 1. Moreover, the motor 20 driving the pumps 17 and 27 is operated by a brake actuating signal supplied from the brake control ECU 1.

It should be noted that the individual actuating signals supplied from the brake control ECU 1 to the hydraulic braking apparatus 2 correspond in aggregate to a first actuating signal. Further, placing the hydraulic braking apparatus 2 into a control pause (or control inhibited) state indicates placing the first actuating signal in its inactive state, namely to zero (the non-actuating state). Specifically, in this standstill state, none of the pressure increase control valves 14a, 14b, 24a and 24b, the pressure decrease control valves 15a, 15b, 25a and 25b, and the SM valves 18 and 28 are energized, and the driving current of the motor 20 becomes zero. Accordingly, upon the first actuating signal becoming inactive, the W/C pressure for each wheel is reduced to zero and therefore the first braking force becomes zero.

Next, a description will be given of the braking operation carried out on the basis of each of the command values for pressure increase, pressure maintenance and pressure decrease, which correspond to the first actuating signal, supplied from the brake control ECU 1. This braking operation is carried out as the automatic braking operation of the above hydraulic braking apparatus 2, regardless of brake pedal application. Note that the operation based on brake pedal application by the driver which is the normal operation, and the operation in ABS control are well known, and thus a description will be omitted here.

In the pressure increase processing in the automatic braking control, the SM valve 18 is switched to ON (the cut-off position) and further the pressure decrease control valve 15a is switched to OFF (the cut-off position). Then, the pump 17 is driven to suck up brake fluid to the reservoir 16 and then discharge it. While the pump 17 generates the discharge pressure, a comparison with the value detected by the oil-pressure sensor 19a is performed to control the pressure increase control valve 14a by ON/OFF duty ratio control. This causes an increase of the W/C pressure at a predetermined change gradient or to a preset target pressure. At this point, the brake fluid is refilled as required from the M/C 10 to the inlet of the pump 17, through the suction line 13 and the reservoir 16.

In the pressure decrease processing in the automatic braking control, the SM valve 18 is switched to ON (the cut-off position) and also the pressure increase control valve 14a is switched to ON (the cut-off position). Then the pump 17 is driven to suck up brake fluid from the reservoir 16 and then discharge it. While the pump 17 generates the discharge pressure, a comparison with the value detected by the oil-pressure sensor 19a is performed to control the pressure decrease control valve 15a by ON/OFF duty ratio control. Thereby, the brake fluid is drawn from the W/C 41FR to reduce the W/C pressure on a predetermined variation gradient or to a preset target pressure.

At this point, further, due to both the pressure increase control valve 14a and the SM valve 18 being in the cut-off position, the discharge pressure of the pump 17 rises. However, when the rising pressure exceeds the elastic force of the spring in the check valve of the SM valve 18, the pressure is released and pressure decrease takes place.

In the pressure-maintenance processing in the automatic braking control, the SM valve 18 is switched to ON (the cut-off position), and both the pressure increase control valve 14a and the pressure decrease control valve 15b are switched to the cut-off positions. As a result, the W/C pressure is maintained.

Next, the motor-operated PKB 3 serving as the second brake unit will be described.

When the vehicle is in a halted state, the motor-operated PKB 3 maintains the halted state. Specifically, the PKB 3 is operated according to the second actuating signal from the brake control ECU 1. In the PKB 3, an actuator including a motor and a gear mechanism (none of these elements are shown) drives each of the brake wires 31R and 31L, in order to press the brake caliper and a friction material in each of wheels 4RR and 4RL against the corresponding brake disc (not shown) for generation of a braking force.

The motor of the motor-operated PKB 3 is duty-driven on the basis of the second actuating signal so as to rotate in the normal direction (in a direction to the braking force), or in the opposite direction (in a direction to the braking force), thereby allowing control of a magnitude of a second braking force.

At this point, a braking force is generated in accordance with the duty ratio, and then reaches the target braking force, whereupon the motor of the motor-operated PKB 3 is locked. When locking of the motor is detected, the driving current for the motor is interrupted, namely the second actuating signal becomes inactive, so as to bring the motor-operated PKB 3 into the control pause (control inhibited) state. When the motor-operated PKB 3 is in the control pause state, the gear mechanism is not operated. Accordingly, the braking force is maintained, and a locked state of the wheels is maintained.

Such operation of the motor-operated PKB 3 is executed by the second actuating signal supplied from the brake control ECU 1 during the automatic brake control. Alternatively, the PKB 3 may be operated such that when the driver turns a parking brake switch (not shown) to ON or OFF, the brake control ECU 1 outputs the second actuating signal for the motor-operated PKB 3 in response to this signal.

As illustrated in FIG. 2, the wheel speed sensors 5 include wheel speed sensors 5FR, 5FL, 5RR, and 5RL for, detecting the rotational speed of each respective wheel. Output signals from the sensors 5FR, 5FL, 5RR and 5RL are input directly to the brake control ECU 1.

It should be noted that a semiconductor speed sensor using a Hall element is employed for the wheel speed sensors 5FR, 5FL, 5RR and 5RL. Hence, even when travelling at low speeds, a pulse signal reliably indicating a wheel rotation speed and rotation direction are obtained. This makes it possible to detect a precise vehicle speed even when the vehicle is changed from the halted state to a moving state.

The accelerator pedal operation amount sensor 7 detects the amount of driver's depression of the accelerator pedal (not shown). The detected amount of depression is input, as the accelerator pedal operation amount, to the brake control ECU 1 via the in-vehicle LAN bus 6.

The brake control ECU 1 uses, as the accelerator pedal operation amount, the degree of accelerator opening which is converted from the amount of depression of the accelerator pedal, or an operation speed of the accelerator pedal which is calculated by differentiating the amount of depression.

When the driver causes the vehicle to starting from a standstill, the driver depresses the accelerator pedal. Accordingly, the accelerator pedal operation amount sensor 7 (and the brake control ECU 1) is equivalent to a starting intention detection unit of the present invention.

The shift position sensor 8 detects a shift position state and receives the detected shift position state to the brake control ECU 1 via the in-vehicle LAN bus 6. The shift positions in the shift position state refer to the gear shift positions of an automatic transmission (not shown), such as D (drive), 2 (second), L (low), R (reverse), N (neutral), P (parking). These shift position are selected by the driver operating the gearshift lever.

When the shift position sensor 8 detects the D range (or the 2 range, or the L range), it is possible to determine that the direction in which the driver intends to move the vehicle is forward. When the R range is detected, it is possible to determine that the direction in which the driver intends to move the vehicle is backward. Accordingly, the shift position sensor 8 functions as an intended direction detecting unit of the present invention.

The backward-and-forward acceleration sensor 9 detects acceleration in the direction of travel, namely the backward-and-forward direction, of the vehicle VL, and receives the detected acceleration to the brake control ECU 1 via the in-vehicle LAN bus 6. It should be noted that the embodiment uses the acceleration detected by the backward-and-forward acceleration sensor 9. However, as a substitute for this, a value attained by differentiation of the wheel rotational speed, which is transmitted from the wheel speed sensors 5, by the brake control ECU 1 may be used.

Next, a description will be given of a control flow executed by the brake control ECU 1 serving as the brake control unit in the automatic brake device of the first embodiment, which has the hardware structure that is described above.

Figure 3:
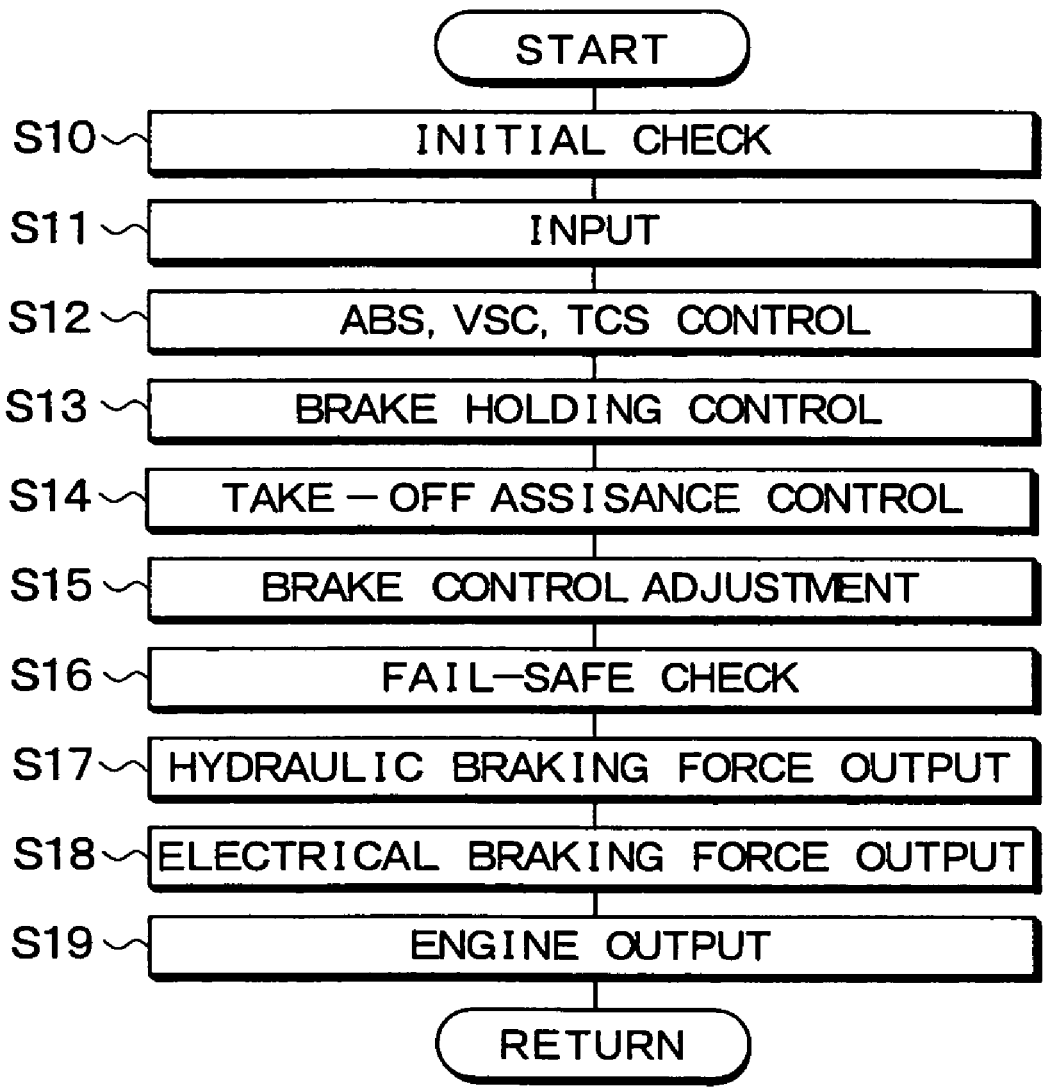
FIG. 3 is a main flow diagram illustrating a procedure of a brake control ECU according to the first embodiment.

FIG. 3 illustrates a main flow diagram of the embodiment. The brake control ECU 1 initiates the processing in the flow diagram when an ignition is turned to ON, and repeats the processing with a predetermined control cycle (e.g., at intervals of 5 ms to 10 ms).

At S10, an initial check and various input processing are executed. In the initial check, each of the actuators of the hydraulic braking apparatus 2 and the motor-operated PKB 3 is operationally checked. Specifically, in the hydraulic brake device 2, an electric current is actually passed through each of the solenoid valves 14a, 14b, 15a, 15b, 24a, 24b, 25a, 25b, 18 and 28. The brake control ECU 1 performs a terminal voltage check on each of the solenoid valves to check for the presence of disconnection in each solenoid valve. Moreover, the brake control ECU 1 determines whether there are any irregularities in oil pressure from the detected values of the oil-pressure sensors 30, 19a, 19b, 29a and 29b, in order to locate failures.

Further, in the motor-operated PKB 3, for location of failures, it is determined whether the detection current is flowing normally during actual energization, whether the motor of the motor-operated PKB is rotating normally, and the like. Note that if a failure is found, the system configuration is capable of taking measures such as inhibition of control, switching to a specified alternative control, lighting up of a warning lamp, or the like, after a failure is determined. Accordingly, it is possible to prevent all the portions of the braking apparatus 2 from performing an abnormal operation, or the like.

At S11, the detected values of the wheel speed sensors 5 are used to obtain the wheel speed of each of the wheels 4FL to 4RR. Further, the vehicle speed is calculated on the basis of a wheel speed of the driven wheels (i.e. the rear right and left wheels in a front wheel drive vehicle).

At S12, brake control is executed in accordance with the running conditions of the vehicle VL. Specifically, brake assist control, ABS control, traction control, and vehicle stability control are performed. The brake assist control increases up the M/C pressure when the brake pedal is depressed strongly. The ABS control inhibits wheel slip and provides an appropriate braking force during stopping of the vehicle when the wheel speed exceeds the vehicle-body speed and an amount of slip has become equal to or higher than a predetermined value. The traction control controls the engine output and the braking force in order to bring about a decrease in the amount of slip when the wheel speed exceeds the vehicle-body speed and the amount of slip is equal to or higher than a predetermined value. The vehicle stability control controls a braking force on each wheel so as to ensure the stability of the vehicle body on the basis of a yaw rate and a lateral acceleration of the vehicle.

At S13, brake holding control is executed. In this processing, a halt-maintenance mode becomes active in order to maintain the vehicle in a halted state. Specifically, braking force is produced by the hydraulic braking apparatus 2 serving as the first brake unit or the motor-operated PKB 3 serving as the second brake unit in order to maintain the halted state of the vehicle. The brake holding control is initiated under the following conditions.

(1) Vehicle speed equals zero; and the brake pedal is depressed continuously beyond a predetermined time period.

(2) Vehicle speed equals zero; and a brake holding start switch provided in the vicinity of the driver's seat is pressed.

(3) Vehicle speed equals zero; and the gear of the transmission is shifted from the D, 2, L or R range in which the vehicle is movable, namely in which a driving force is generated, to either the P or N range in which the vehicle is not movable, that is, in which a driving force is not generated.

When any one of these conditions is satisfied, a target braking force capable of maintaining the vehicle in the halted state is set. At this point, the target braking force is set to be, for example, a maximum braking force generated by an actuator of each brake device, or a braking force generated when the halted state of the vehicle is maintained by the brake pedal at a vehicle speed of zero prior to initiation of the brake holding operation.

At S14, starting assistance control is executed. For example, when the driver operates the accelerator pedal after stopping the vehicle, the target braking force which is set by the brake holding control is adjusted, and a target braking force is set for each brake device in accordance with the starting assistance control. The processing at S14 will be described later.

At S15, adjustment among the various brake control systems is performed based on the target braking force determined at S12, the target braking force in the starting assistance control determined at S14, and a target braking force based on braking requirements from other braking requirement systems (not shown). For example, the highest target braking force is selected from among the above target braking forces. Note that the other braking requirement systems described herein may be, for example, a inter-vehicle distance control ECU for maintaining the distance between the vehicle concerned and the vehicle in front at a constant distance, an emergency-vehicle stop ECU for stopping the vehicle in an emergency, or the like.

At S16, a fail-safe check when the ignition is ON is executed. Specifically, the states of the brake control ECU 1, the hydraulic braking apparatus 2, the motor-operated PKB 3 and the other sensors are diagnosed at all times. If a failure is detected, predetermined measures are taken in order to prevent the vehicle VL from entering a dangerous situation.

At S17, when the target braking force selected at S15 is for the hydraulic braking apparatus 2, the first actuating signal is output from the brake control ECU 1. Thus, the first braking force generated by the hydraulic braking apparatus 2 is controlled to be the target braking force.

At S18, when the target braking force selected at S15 is for the motor-operated PKB 3, the second actuating signal is output from the brake control ECU 1. Thus, the second braking force generated by the PKB 3 is controlled to be the target braking force.

At S19, an engine output command value is output for engine output control having no direct connection with the accelerator pedal operation, such as engine output control in TRC control, and the like.

Next, a flow diagram for the starting assistance control performed by the brake control ECU 1 will be described with reference to FIG. 4 and FIG. 5. Note that this processing is executed at S14 in the main flow diagram shown in FIG. 3. Therefore, the starting assistance control flow is also repeated with the predetermined control cycle.

Note that, for the description given herein, it is assumed that, for example, a braking force for retaining a halted state of the vehicle is generated on each wheel by the hydraulic braking apparatus 2 in the brake holding control performed at S13. The starting assistance control is performed depending upon whether or not the driver operates the accelerator pedal in this state.

At S100, it is determined whether or not the driver operates the accelerator pedal, that is, whether or not the accelerator pedal operation amount sensor 7 detects the driver's starting intention. If the determination result at S100 is NO, it is determined that the driver does not have a starting intention and the procedure moves to S110. Thus, the target braking force is set so as to retain the braking force at this point, namely, the braking force is not changed, and then the procedure moves to S190.

Note that at S100, in order to provide an anti-noise measure, when the detected accelerator pedal operation amount becomes equal to or lager than a preset offset amount, it is determined that the accelerator pedal is being operated.

If the determination result is YES in at S100, the procedure moves to S122. At S122, it is determined whether or not an initial pressure decrease mode is complete. Here, the initial pressure decrease mode is a mode for decreasing the W/C pressure in order to allow detection of the direction in which the vehicle actually moves (hereinafter referred to as "the actual movement direction") as a vehicle movement direction detection mode. This initial pressure decrease mode is executed in the initial stage of the pressure decrease for the W/C pressure that is performed when the vehicle starts to move. By performing the initial pressure decrease, the braking force of the vehicle is decreased. Therefore the vehicle begins to move and the movement direction of the vehicle is detected.

The determination as to whether or not the initial pressure decrease in the above processing is complete is made, for example, on the basis of the state of an initial pressure decrease completion flag that is set at which the initial pressure decrease is completed. If the initial pressure decrease completion flag is ON, the determination that the initial pressure decrease is complete is made and the procedure moves to S130. If it is OFF, the procedure moves to S123 for the initial pressure decrease.

At S123, an initial pressure decrease amount γ is determined based on the calculation of Equation 1.

$$\gamma = A1 \times \text{the degree of accelerator opening} + A2 \times \text{elapsed time} \quad (1)$$

where, the degree of accelerator opening represents a value detected by the accelerator pedal operation amount sensor 7; the elapsed time represents an elapsed time proportional to the number of times processing S123 is repeated; and A1 and A2 are proportionality constants for the degree of accelerator opening and the elapsed time, respectively.

In Equation 1, the initial pressure decrease amount γ is set larger the higher the degree of accelerator opening (i.e., the vehicle speed at which the driver intends the vehicle to start), and further, is also set larger the longer the process time period of the initial pressure decrease process.

Next, at S124, a braking force, which is lower than the braking force applied as the target braking force at this time by an amount of braking force corresponding to the initial pressure decrease amount γ set as above, is set as the new target braking force. Through this process, when performing the initial pressure decrease, it is possible to decrease the target braking force at the decrease gradient of the initial pressure decrease amount γ in each control cycle of the main flow.

As a result of the above decrease in the target braking force, the vehicle VL moves. The movement at this point is in accordance with the relationship between the accelerator pedal operation of the driver and the road-surface gradient. Accordingly, the movement may be in agreement with the vehicle movement direction (forward or backward) indicated by the shift position of the automatic transmission which is detected by the shift position sensor 8. Alternatively, the movement may be in the opposite direction to the vehicle movement direction indicated by the shift position.

At S125, it is determined whether or not the number of the wheel-speed sensor pulses output from the wheel speed sensors 5 exceeds a preset N pulses. If the determination result is YES, at S126, it is possible to detect the actual movement direction of the vehicle from the rotational direction of the wheels detected by the wheel speed sensors 5. Therefore, the initial pressure decrease processing is completed and the initial pressure decrease completion flag is switched to ON. Then the procedure moves to S130. If the determination result is NO, the routine is terminated, and the procedure moves to S17 explained previously in order to actually generate the target braking force set in S124. Accordingly, the above initial pressure decrease processing is repeated.

In this way, the operation in the initial pressure decrease mode makes it possible to detect the actual movement direction, which is determined based on three items, the gradient of the sloping road, the intended movement direction based on the shift position, and the magnitude of the driver's intention to move the vehicle based on the accelerator pedal operation amount. Accordingly, detection of the actual movement direction is possible without the use of a special device for measuring the gradient of the sloping road.

Next, upon termination of the initial pressure decrease processing (initial pressure decrease mode), the procedure enters an auxiliary brake mode. At S130, it is determined whether or not the detected actual movement direction of the vehicle is in agreement with the shift position detected by the shift position sensor 8.

If the determination result is YES, namely, the same direction or the halted state (vehicle speed=zero), a same direction mode is selected and the procedure moves to S140. However, if the determination result is NO, an opposite direction mode is selected and the procedure moves to S180.

Further, the processing in S130 is repeated after completion of the initial pressure decrease mode. Hence, the comparison between the actual movement direction of the vehicle and the driver's intended movement direction is constantly made in order to determine whether the two directions are the same direction or the opposite directions, or whether the vehicle is in a halted state or not.

In the same direction mode, at S140, in order to decrease the target braking force at a predetermined decrease gradient, a pressure decrease amount α for the W/C pressure that corresponds to the target braking force decrease is calculated.

Specifically, the pressure decrease amount α is calculated as follows.

Figure 6:
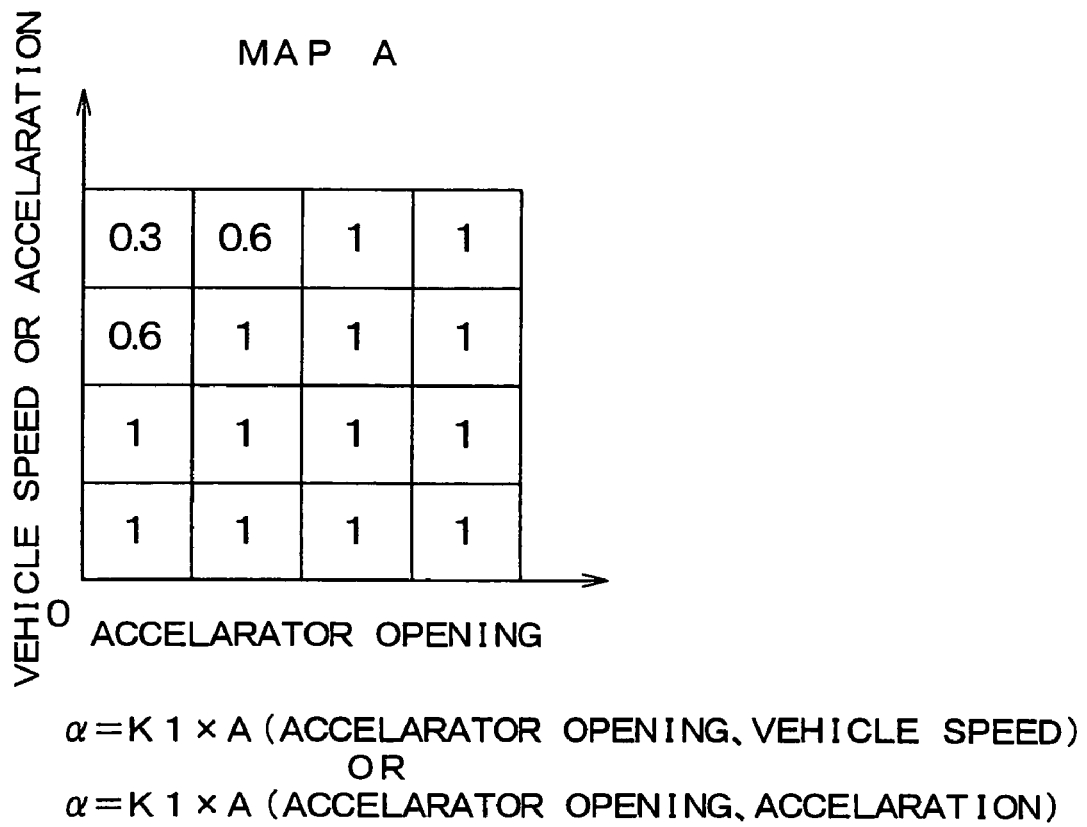
FIG. 6 shows a map for determining a set value of a pressure decrease amount α in a same direction mode according to the first embodiment.

First, map A as illustrated in FIG. 6 is preset. Map A is a two-dimensional map showing the degree of accelerator opening against the vehicle speed or the acceleration. Coefficient A used for calculation of the pressure decrease amount α is set to decrease in accordance with the vehicle speed (or the acceleration) and to increase in accordance with the degree of accelerator opening. Further, on a steep downhill slope that leads to significantly high vehicle speed and acceleration in spite of a low degree of accelerator opening, a small coefficient A and a moderate decrease of the W/C pressure are set in order to prevent the vehicle from accelerating abruptly.

A coefficient A according to the vehicle speed (or the acceleration) and the degree of accelerator opening is read based on the two-dimensional map. Then, the read coefficient A is used as a proportionality coefficient for an initial value K1 of a pressure decrease amount α, and the pressure decrease amount α of the W/C pressure is calculated from the equation α=K1×A. The attained result is the pressure decrease amount α of W/C pressure per cycle, which serves as the decrease gradient.

The target braking force thus set serves the purpose of decreasing the braking force in order to smoothly start and accelerate the vehicle when the actual movement direction of the vehicle and the driver's intended movement direction are identical with each other. A pressure decrease amount of this target braking force is in accordance with the degree of accelerator opening. As a result, when abrupt acceleration with a high degree of accelerator opening is required, the braking force is decreased at an earlier point.

Note that the vehicle speed is calculated from the value detected by the wheel speed sensors 5, and the acceleration is calculated as a differential of the vehicle speed. Further, the acceleration may also be calculated using a value detected by the backward-and-forward acceleration sensor 9.

Then, at S150, a braking force resulting from subtraction of the above calculated pressure decrease amount α serving as the decrease gradient from the present target braking force is set as a new target braking force. Then determination regarding continuation of the starting assistance control is executed at S190. Specifically, it is determined whether the starting assistance control is to be continued or not.

More particularly, at S190, it is determined whether or not the vehicle speed exceeds a predetermined value (e.g., 15 km/h, or a vehicle speed according to the degree of accelerator opening) when the driver's intended movement direction and the actual vehicle movement direction are the same direction. If the vehicle speed becomes larger than the predetermined value, based on the assumption that the starting operation has been tentatively completed, the starting assistance control is terminated (at S192).

Further, at S190, if the vehicle speed in the same direction does not exceed the predetermined value, it is determined that the starting assistance control, which includes time periods when the vehicle stops (vehicle speed=zero) and when the vehicle moves in the opposite direction, is not complete. In this case, the processing beginning with processing S100 is repeated in the next control cycle.

The starting assistance control flow thus terminates, and therefore at S17 of the main flow diagram, the first actuating signal is applied to the hydraulic braking apparatus 2 for generation of the target braking force determined in the above processing.

On the other hand, in the opposite direction mode, the following processing is executed. Note that the opposite direction mode described herein corresponds to a first opposite direction mode of the present invention, in which the braking force is controlled in accordance with a deviation between the vehicle speed and the target speed. Hereinafter, the opposite direction mode of the first embodiment will be referred to as the "first opposite direction mode".

First, it is determined at S180 whether or not the present vehicle speed is higher than a preset target speed Vlimit. The target vehicle speed Vlimit described here indicates a reference value for preventing movement of the vehicle in the opposite direction. If the determination result at S180 is YES, the procedure moves to S184 to calculate from Equation 2 a pressure increase amount β for each cycle of the W/C pressure, in order to increase the target braking force at a predetermined increase gradient.

$$\beta = K2 \times (\text{vehicle speed} - V\text{limit}) \qquad (2)$$

where, K2 is a conversion factor for conversion of the amount of speed deviation, which corresponds to a difference between the vehicle speed and the target vehicle speed Vlimit, to an increased braking force. This conversion factor K2 is preset.

Then, at S186, the pressure increase amount β calculated as the increase gradient is added to the present target braking force to produce a braking force, which is then set as the new target braking force. Then, following determination regarding continuation of the starting assistance control at S190, in order to generate the target braking force concerned, at S17, the first actuating signal is applied to the hydraulic braking apparatus 2 serving as the braking-force application unit.

If the determination result at S180 is NO, i.e., the vehicle speed≦Vlimit, the target braking force is set so as not to change at S182, based on the assumption that the vehicle speed has not reached the target speed. Then, at S17, the target braking force set in the brake holding control is generated.

The processing of the first opposite direction mode, namely, processing from S180 to S184, S186 (and then to S17), is for controlling the braking force such that the deviation between the vehicle speed and the target speed Vlimit approaches zero. This processing corresponds to feedback control.

As described above, in the first embodiment, when the vehicle is placed in the halted state by a braking force applied to the wheels thereof, the driver operates the accelerator pedal as an indication of the driver's starting intention. Thereupon, first, in the initial pressure decrease mode, pressure is decreased from the braking force applied to the vehicle during the halted state by the pressure decrease amount γ in each predetermined cycle. Thus, the vehicle starts to move at a gentle pace, and the direction in which the vehicle is moved by means of the initial pressure decrease is detected as the actual movement direction.

The detected actual movement direction is compared with the shift position detected as the intended direction in which the driver intends to move. When the actual movement direction and the intended direction are the same direction, operation in the same direction mode is performed in order to further reduce the braking force at the predetermined decrease gradient (the pressure decrease amount α). Accordingly, prompt starting of the vehicle is executed.

On the other hand, when the actual movement direction and the intended movement direction are opposite directions, operation in the first opposite direction mode is performed in which the braking force is increased at the predetermined increase gradient (the pressure increase amount β) until the vehicle speed in the opposite direction is decreased to be equal to or lower than the target speed. Then, control is executed such that the braking force does not change after the vehicle speed is equal to or lower than the target speed. In other words, it is possible to apply the brake in such a manner as to exert control on the speed of the vehicle that is travelling in the opposite direction to the driver's intention. This makes it possible to prevent the vehicle driver from feeling uneasy.

Through the operation in the first opposite direction mode, the vehicle speed is decreased to be equal to or lower than the target speed in the direction opposite to the intended movement direction. Further, assuming that the vehicle speed when the driver's intended movement direction and the actual movement direction of the vehicle are the same direction is positive, the vehicle speed is changed from negative to zero and then to positive due to maintenance of a constant braking force and the continuation of the accelerator pedal operation. Hence, after the vehicle speed is changed to positive, the operation in the same direction mode is initiated, and finally it is possible to smoothly execute starting of the vehicle.

Figure 7:
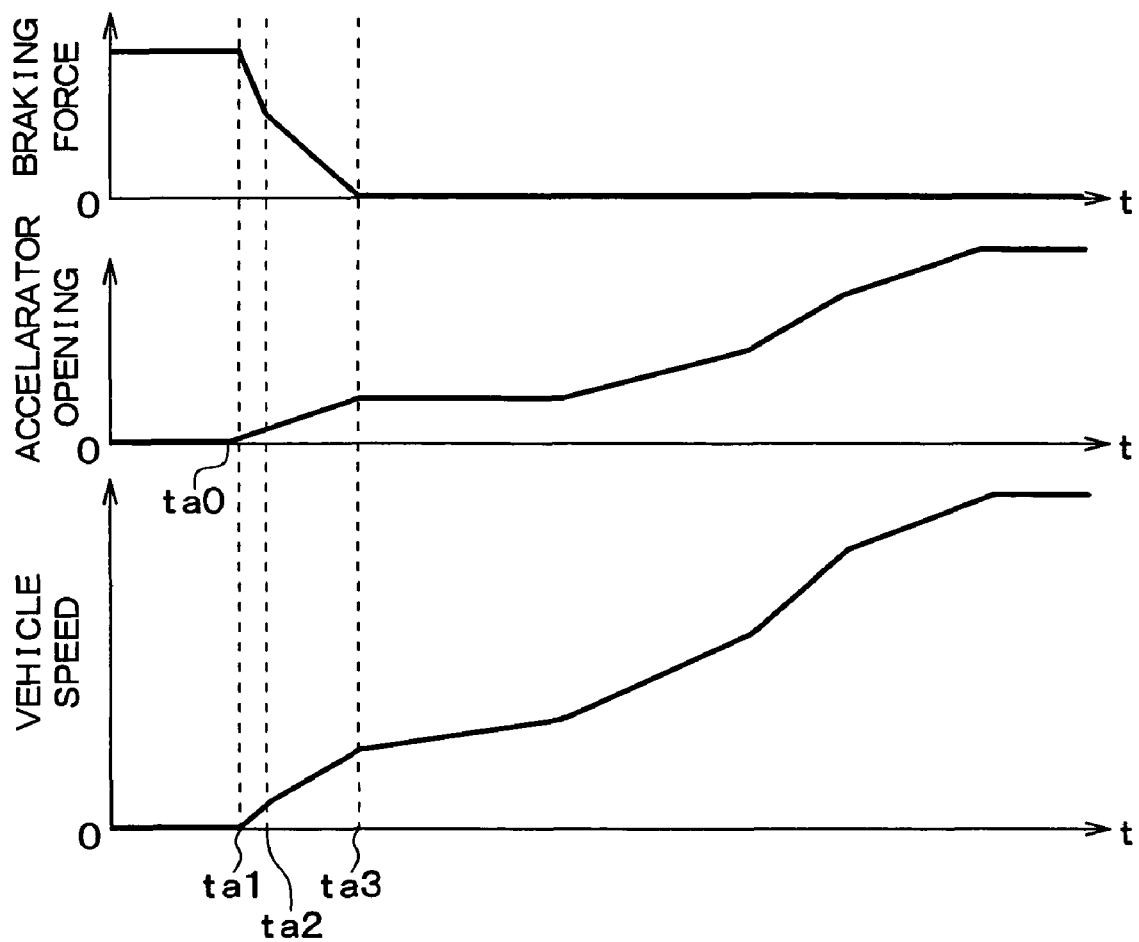
FIG. 7 is a time diagram illustrating an example of the starting operation in the first embodiment.

Next, a description will be given of an example of the operation of the automatic brake device that executes the processing as described above in the first embodiment. FIG. 7 shows time diagrams of the braking force generated by the hydraulic braking apparatus 2 and the PKB 3 which serve as the braking-force application unit; the degree of accelerator opening that corresponds to the amount of driver's operation of the accelerator pedal; and the vehicle speed of the vehicle VL that moves as a consequence of the control. FIG. 7 illustrates the state of the starting assistance control when the driver's intended movement direction is set as forward after the vehicle VL has been maintained in a downhill halted state. Note that in FIG. 7, the change in the amount of accelerator pedal operation represents the accelerator pedal operation by the driver during normal starting.

At the time t=ta0, the driver depresses the accelerator pedal. Then, at the time t=ta1, when the amount of accelerator pedal operation exceeds an offset value (at S100), the system switches to the initial pressure decrease mode (at S122) to decrease the braking force by the initial pressure decrease amount γ corresponding to the predetermined decrease gradient (at S123, S124 and S125).

When the number of pulses of the wheel speed sensors 5 in the initial pressure decrease mode exceeds a predetermined value N, that is, when the amount of movement of the vehicle exceeds a predetermined amount (at S125), the actual vehicle movement direction is detected. In this case, the vehicle is on a downhill slope, so the fact that the actual vehicle movement direction is the forward direction is detected. Hence, due to the agreement between the actual vehicle movement direction and the forward direction that is the driver's intended movement direction (at S130), operation in the same direction mode as the auxiliary brake mode is carried out.

The pressure decrease amount α that determines the decrease gradient in the same direction mode is calculated by use of a coefficient obtained from the map A in accordance with the degree of accelerator opening and the vehicle speed (at S140). Then, the target braking force is decreased by the calculated pressure decrease value α (at S150), and a braking force is generated in the hydraulic braking apparatus 2 serving as the braking-force application unit in order to attain the target braking force.

The operation (at S130, S140 and S150) is repeated until the target braking force becomes zero because the initial pressure decrease is terminated. As a result, in the time period from t=ta2 to t=ta3, the braking force is decreased at the decrease gradient defined by the pressure decrease amount+α, and the vehicle speed is increased in accordance with the increase in the amount of accelerator pedal operation (in this case, the degree of accelerator opening) at that time.

In the time period t>ta3, the vehicle speed is in accordance with the accelerator pedal operation amount because the braking force becomes zero.

Figure 8:
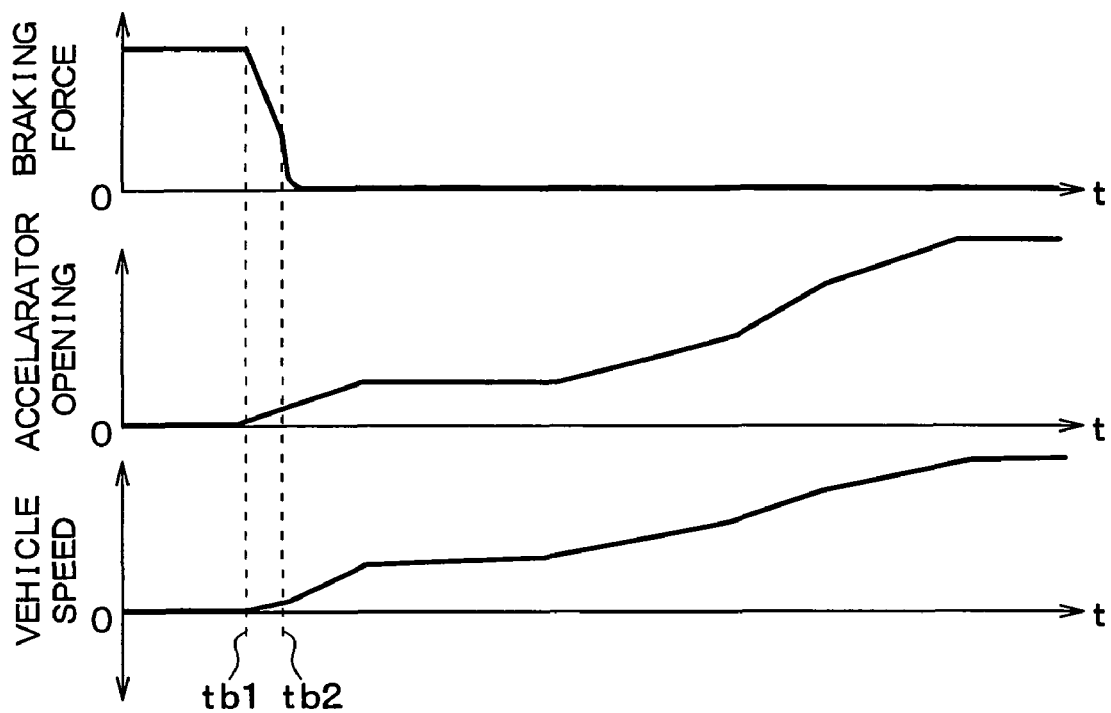
FIG. 8 is a time diagram illustrating another example of a starting operation in the first embodiment.

FIG. 8 illustrates the state of the starting assistance control when the driver's intended movement direction is set as forward after the vehicle VL has been maintained in a halted state on a level road.

As in the case of the example of FIG. 7, after the initiation of the accelerator pedal operation, the system switches to the initial pressure decrease mode (at S122) at t=tb1 when the accelerator pedal operation amount exceeds the offset value. During the time period from t=tb1 to t=tb2, as a result of the initial pressure decrease by the initial pressure decrease amount γ (at S124) and the detection of the actual movement direction by means of the rotational pulse detection of the wheel speed sensor (at S125), the same direction mode (at S140) is selected as the auxiliary brake mode.

Upon switching to the same direction mode at t=tb2, the braking force is decreased by the pressure decrease amount α (at S150). Note that, as compared with the case in which the vehicle moves forward downhill as described in FIG. 7, the decrease of the braking force is rapid such that the braking force becomes zero in a short time. This is because in the case of the downhill slope, the W/C pressure is reduced gently in order to prevent the vehicle from abruptly starting, due to the effect of gravity. Whereas, in the case of the level road, the W/C pressure is reduced swiftly since it is assumed that starting will not occur abruptly as a result of gravity.

After the braking force reaches zero, as in the case of the example described in FIG. 7, the vehicle speed is in accordance with the accelerator pedal operation amount.

Next, a description will be given, with reference to the time diagrams in FIG. 9, of the operational state of the starting assistance control when the driver's intended movement direction is set as forward after the vehicle VL has been maintained in an uphill halted state.

As in the case of the foregoing example in FIG. 7, after the initiation of the accelerator pedal operation, the initial pressure decrease mode (at S122) is switched to at the time t=tc1, when the accelerator pedal operation amount exceeds the offset value. During the time period from t=tc1 to t=tc2, the initial pressure decrease by the initial pressure decrease amount γ (at S124) and the detection of the actual movement direction by means of the rotational pulse detection of the wheel speed sensor (at S125) are carried out.

Figure 9:
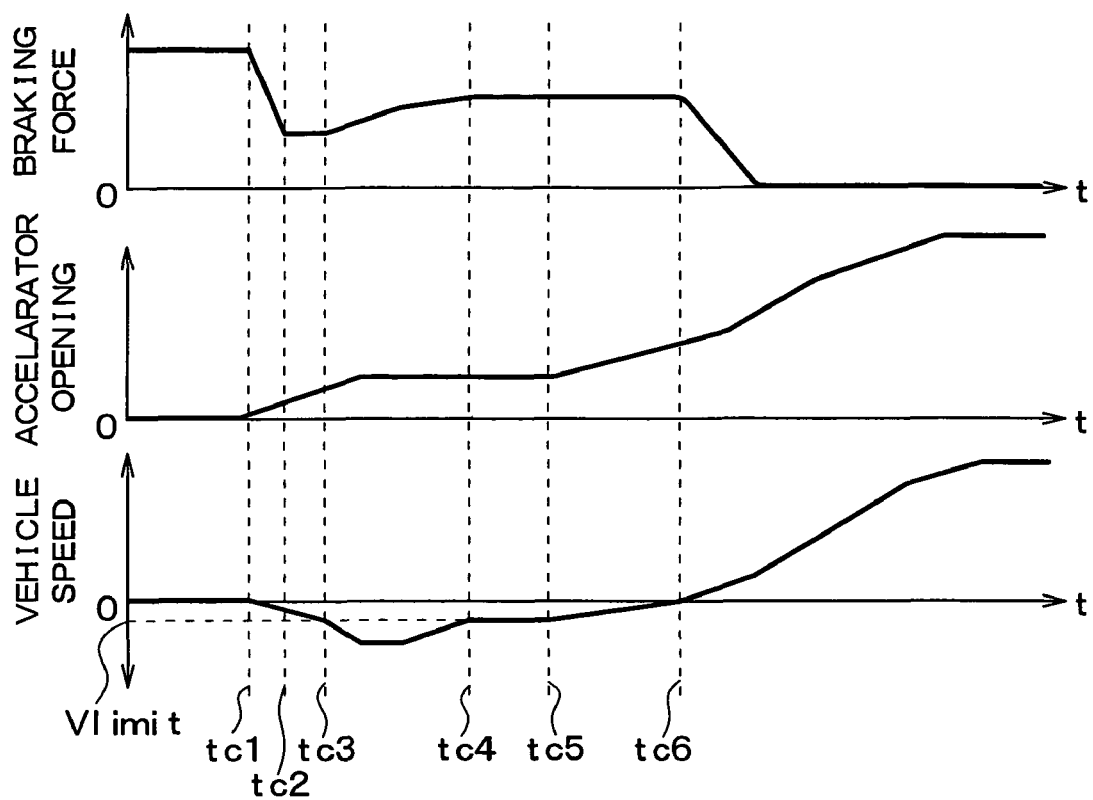
FIG. 9 is a time diagram illustrating yet another example of the starting operation in the first embodiment.

However, the example in FIG. 9 represents a situation in which, due to the uphill slope, with the initial pressure decrease of the braking force, the vehicle starts moving in a backward direction due to an insufficient degree of accelerator opening. In other words, the actual movement direction (the backward direction) that the vehicle starts to move in is opposite to the intended movement direction (the forward direction).

Therefore, as a result of the direction comparison in the auxiliary brake mode (at S130), the system switches to the first opposite direction mode and the vehicle speed is compared with the preset target speed Vlimit (at S180). If the vehicle speed in the opposite direction is lower than the target speed Vlimit (tc2≦t≦tc3), the pressure increase amount β for the braking force is zero (at S182), and therefore the braking force does not change.

When the vehicle speed in the opposite direction is further increased and exceeds the target speed Vlimit (t=tc3), a pressure increase amount β is calculated as a value according to the amount of speed deviation from Equation 2 (at S184). Then, the pressure increase amount β is used as the increase gradient for setting the increased target braking force (at S186), and then a braking force sufficient for attaining the target braking force is applied to each of the wheels.

During the time period in which the vehicle speed exceeds the target speed (tc3≦t≦tc4), the above operation (at S180, S184 and S186) is repeated. Therefore, due to an increase in braking force, the vehicle speed in the opposite direction changes from increase to decrease, and further, to equal to or lower than the target speed.

After the vehicle speed has decreased to the target speed at t=tc4, the pressure increase amount β indicating an increase amount of the braking force is equal to zero, in other words, the braking force is not changed and is maintained at a constant value. During this time, in the example of FIG. 9, the vehicle moves backward on the uphill slope at a constant speed (target speed) with the degree of accelerator opening and the braking force constant.

When the driver further depresses the accelerator pedal at t=tc5, the driving torque exceeds the braking force and thus the speed of the backward movement of the vehicle decreases. Further, at t=tc6, the movement direction of the vehicle changes from backward to forward. As of this point in time, the system switches to the same direction mode (at S130, S140 and S150), and a decrease in the braking force in accordance with the pressure decrease amount α is initiated. Finally, the braking force reaches zero and the vehicle travels in the forward direction, which is the intended movement direction, at a vehicle speed that accords with the accelerator pedal operation amount.

Up to this point, a description has been given of examples in which the intended movement direction that the driver intends to start in is the forward direction. However, even when the intended movement direction is the backward direction, the operation is carried out based on the relationship between the intended movement direction and the actual movement direction of the vehicle, as in the foregoing examples.

According to the first embodiment, when a vehicle is placed in the halt-maintenance state by application of a predetermined braking force (the halt-maintenance mode), while action of a driving force on the wheels in accordance with the accelerator pedal operation, which represents the starting intention, is maintained, the braking force is gradually decreased (the initial pressure decrease mode) with respect to the intended movement direction in which the driver intends to starting that is indicated by shifting of the gear shift position. By use of this mode, the vehicle is moved. Then, based on the direction of this movement, the actual movement direction of the vehicle is detected (the vehicle movement direction detection mode).

The actual vehicle movement direction at this point in time is not always the direction in which the driver intends to start, and differs from this intended direction in accordance with gravity, which depends on the road-surface gradient, acting on the vehicle in the halted state, and the degree of accelerator opening that corresponds to the degree of the driver's starting intention (and, additionally, the magnitude of the braking force in the halt-maintenance state).

If the actual movement direction of the vehicle and the driver's intended movement direction in the initial pressure decrease mode are identical with each other, the braking force applied is gradually decreased by the pressure decrease amount, in accordance with the amount of accelerator pedal operation and the vehicle speed (or the acceleration of the vehicle speed). Finally, this braking force is removed when the vehicle speed equals zero. As a result of this (the auxiliary brake mode), it is possible to execute starting at a speed that corresponds to the degree of accelerator opening, which serves as the amount of accelerator pedal operation.

Further, as in the case of starting on the sloping road, when the actual movement direction of the vehicle in the initial pressure decrease mode is different from the direction intended by the driver, namely the direction is opposite to that intended by the driver, if the vehicle speed in the opposite direction exceeds a predetermined target speed, control is executed such that the braking force is gradually increased at an amount of pressure increase according to a speed deviation between the vehicle speed and the target speed in order to control the vehicle speed. Accordingly, the vehicle speed in the opposite direction is reduced so as to be equal to or lower than the target speed. Conversely if the vehicle speed is equal to or lower than the target speed, the braking force is controlled so as to be kept constant. This makes it possible to decrease the vehicle speed when the vehicle moves in the opposite direction to the driver's intended movement direction, and also to move the vehicle in the same direction from a standstill (the first opposite direction mode). Finally, operation in the same direction mode makes it possible to start in the driver's intended movement direction.

As a result, the braking force is controlled in accordance with the orientation of the vehicle and the gradient direction of a sloping road, and also in accordance with the driver's intended movement direction and the degree of accelerator opening representing the degree of the starting intention. This makes it possible to perform a smooth starting operation of the vehicle in response to the intention of the driver, without detection or estimation of the magnitude of the gradient of the sloping road.

Second Embodiment

Next, an automatic brake device of a second embodiment according to the present invention will be described. The second embodiment is the same as the foregoing first embodiment with respect to the entire structure illustrated in FIG. 1, the structure of the hydraulic braking apparatus 2 illustrated in FIG. 2, and the processing of the main flow diagram illustrated in FIG. 3. Accordingly, a description of these elements and processing will be omitted here.

In the second embodiment, a starting assistance control flow that is executed by the brake control ECU 1 is different from that in the first embodiment. The points of difference will be described below.

Figure 10:
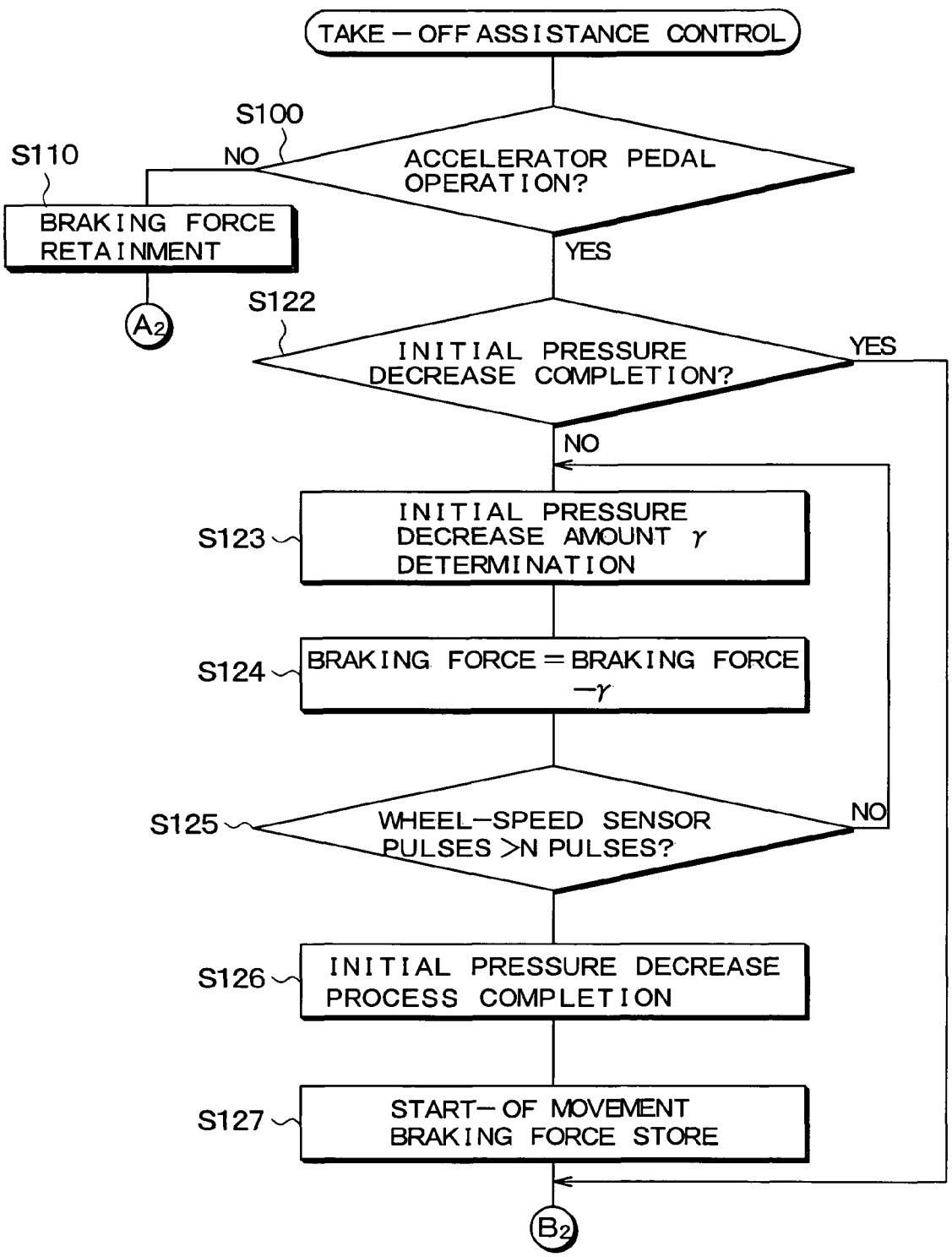
FIG. 10 is part of a flow diagram of a starting assistance control of a second embodiment according to the present invention.
Figure 11:
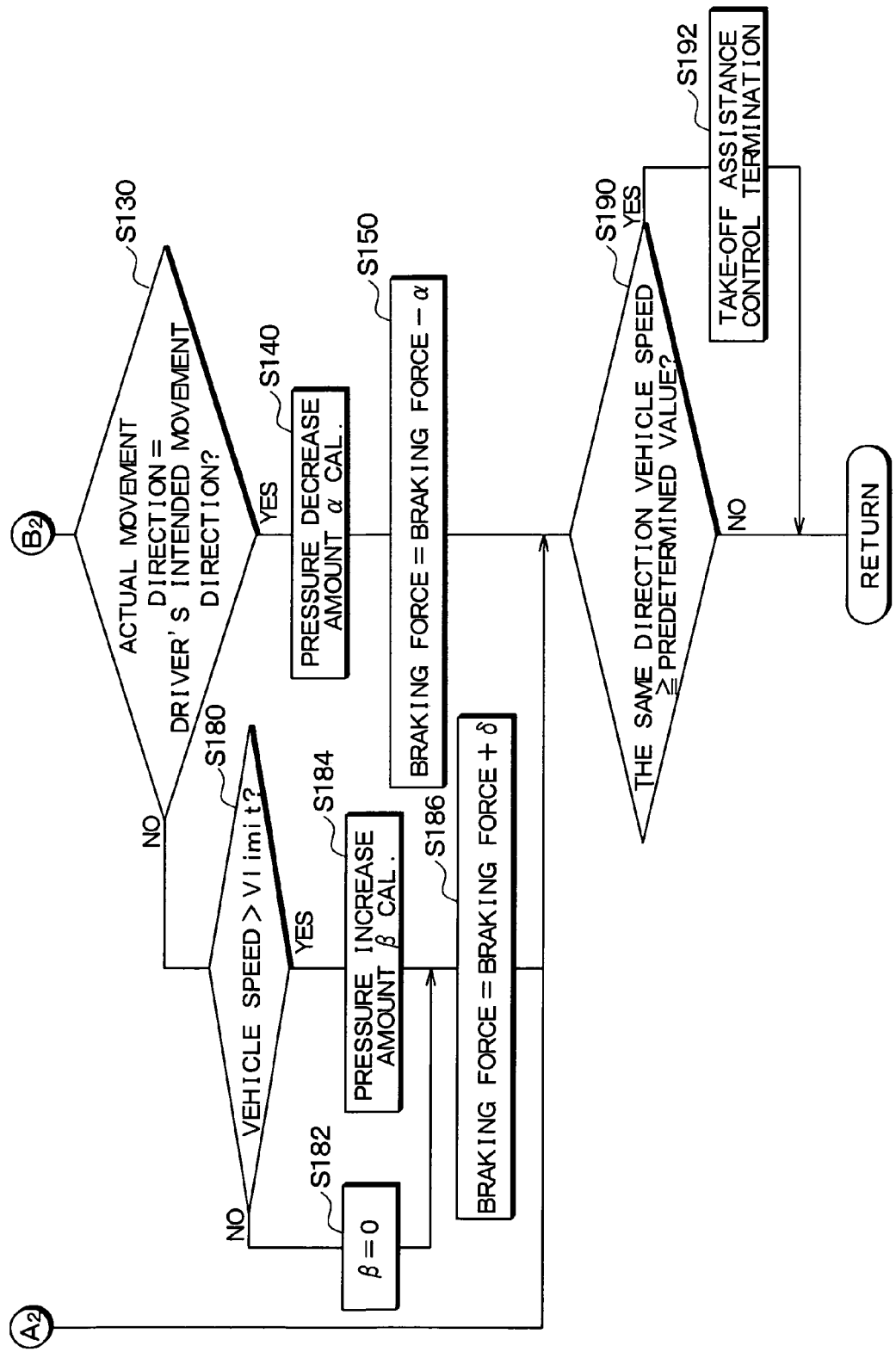
FIG. 11 is another part of the flow diagram of the starting assistance control of an automatic brake device according to the second embodiment.

FIGS. 10 and 11 illustrate the control flow of the starting assistance control in the second embodiment. Note that the processing for executing the same processing as those in the control flow (in FIGS. 4 and 5) of the first embodiment is designated with the same reference numerals and a description is omitted.

The processing in the control flow in the second embodiment (FIGS. 10 and 11) is repeated with a predetermined control cycle (e.g., at intervals of 5 ms to 10 ms) as in the case of the control flow in the first embodiment.

The second embodiment differs from the first embodiment with respect to the following points.

At the point of completion of the initial pressure decrease mode as in the first embodiment, at S127, the ECU 1 stores, as a start-of-movement braking force, the braking force that acts when the vehicle VL begins moving in the actual movement direction during the processing of gradually decreasing the braking force through the initial pressure decrease.

Then, upon selection of the opposite direction mode at S130, the processing at S170 is performed. The opposite direction mode described herein is equivalent to a second opposite direction mode in the present invention.

At S170, a target braking force is determined. Specifically, the braking force resulting from the addition of a predetermined value δ to the start-of-movement braking force stored at S127 is set as a target braking force. Thereafter, the procedure moves to S190.

The predetermined value δ used is for setting the target braking force at a value slightly larger than the start-of-movement braking force. By setting the target braking force at S170, the movement of the vehicle in the opposite direction is stopped.

Further, at S170, an initial pressure decrease completion flag is set to OFF in advance. Due to this, it is possible, after the vehicle is stopped, to switch to the initial pressure decrease mode when the accelerator pedal is depressed in order to start again.

As described above, in the automatic brake device in the second embodiment, operation as in the first embodiment is performed in the same direction mode. However, when operating in the second opposite direction mode, irrespective of the magnitude of the vehicle speed in the opposite direction, a braking force is applied that is slightly larger than the braking force utilized when the vehicle starts in the initial pressure decrease mode. In other words, in the second opposite direction mode, without making the determination concerning the deviation between the vehicle speed and the target speed as in the first embodiment, a braking force capable of stopping the vehicle is generated. Therefore, it is possible to reliably stop the vehicle when the second opposite direction mode is active.

It should be noted that, if the degree of accelerator opening is increased during continuation of the above described vehicle halted state, the determination that the driver's intended movement direction and the actual vehicle movement direction are identical with each other is made at S130 through a repeated processing. Hence, the operation in the same direction mode is initiated to decrease the braking force by the pressure decrease amount α. However, when the degree of accelerator opening is not increased or when the increase in the degree of accelerator opening is insufficient, the second opposite mode is re-selected so that the braking force is set at a value "start-of-movement braking force+δ", and the vehicle is placed in the halted state. This operation is repeated.

However, in such a situation, the driver typically depresses the accelerator pedal further in order to start in the intended movement direction (in the forward direction in the embodiment). For this reason, the same direction mode is switched at S130 in order to decrease the braking force by the pressure decrease amount α (at S140, S150). Accordingly, it is possible to start in the same direction as the driver's intended movement direction, i.e., in the forward direction, at a vehicle speed that corresponds to the accelerator pedal operation amount.

Further, in the repeated processing from: stopping in the second opposite direction mode; to decreasing the braking force in the same direction mode; to moving in the opposite direction; to increasing the braking force (start-of-movement braking force+δ) in the second opposite direction mode; to stopping; and so on, if the driver stops the accelerator pedal operation (and further depresses the brake pedal), it is possible to maintain the braking force of the halted state and maintain the vehicle in the halted state through the processing at 100 and 110 in the flow shown in FIG. 10.

In the second embodiment, as in the case of the first embodiment, the actual movement direction of the vehicle is detected in the initial pressure decrease mode. Then, if the actual movement direction is identical to the driver's intended movement direction, the applied braking force is gradually decreased by the pressure decrease amount that accords to the accelerator pedal operation amount and the vehicle speed (or the acceleration of the vehicle speed). This braking force is then finally cancelled when the vehicle speed is zero (the auxiliary brake mode). As a result, the vehicle is able to start at a speed corresponding to the degree of accelerator opening, which represents the accelerator pedal operation amount.

Further, in the second embodiment, when the actual movement direction differs from the intended movement direction, the braking force while the vehicle is moving is increased to the start-of-movement braking force, which is the braking force applied when the vehicle starts to move in the initial pressure decrease mode (the second opposite direction mode), in order to reliably stop the movement of the vehicle in the opposite direction. After this, operation in the same direction mode is executed and then the vehicle is able to start.

As a result, in the second embodiment, it is also possible to execute a smooth starting operation of the vehicle in accordance with the intention of the driver in any halted state. This can be executed by controlling braking force in accordance with the orientation of the vehicle and the gradient direction of the sloping road, the driver's intended movement direction, and the degree of accelerator opening representing the magnitude of the starting intention. Accordingly, detection or estimation of the magnitude of the gradient of the sloping road is not necessary.

Third Embodiment

Next, an automatic brake device of a third embodiment according to the present invention will be described. The third embodiment is the same as the foregoing first and second embodiments with respect to the entire structure illustrated in FIG. 1, the structure of the hydraulic braking apparatus 2 illustrated in FIG. 2, and the processing in the main flow diagram illustrated in FIG. 3. Accordingly, a description of these elements and processing will be omitted here.

In the third embodiment, a starting assistance control flow that is different from those in the first and second embodiments is executed by the brake control ECU 1. Therefore, the points of difference will be described below.

Figure 12:
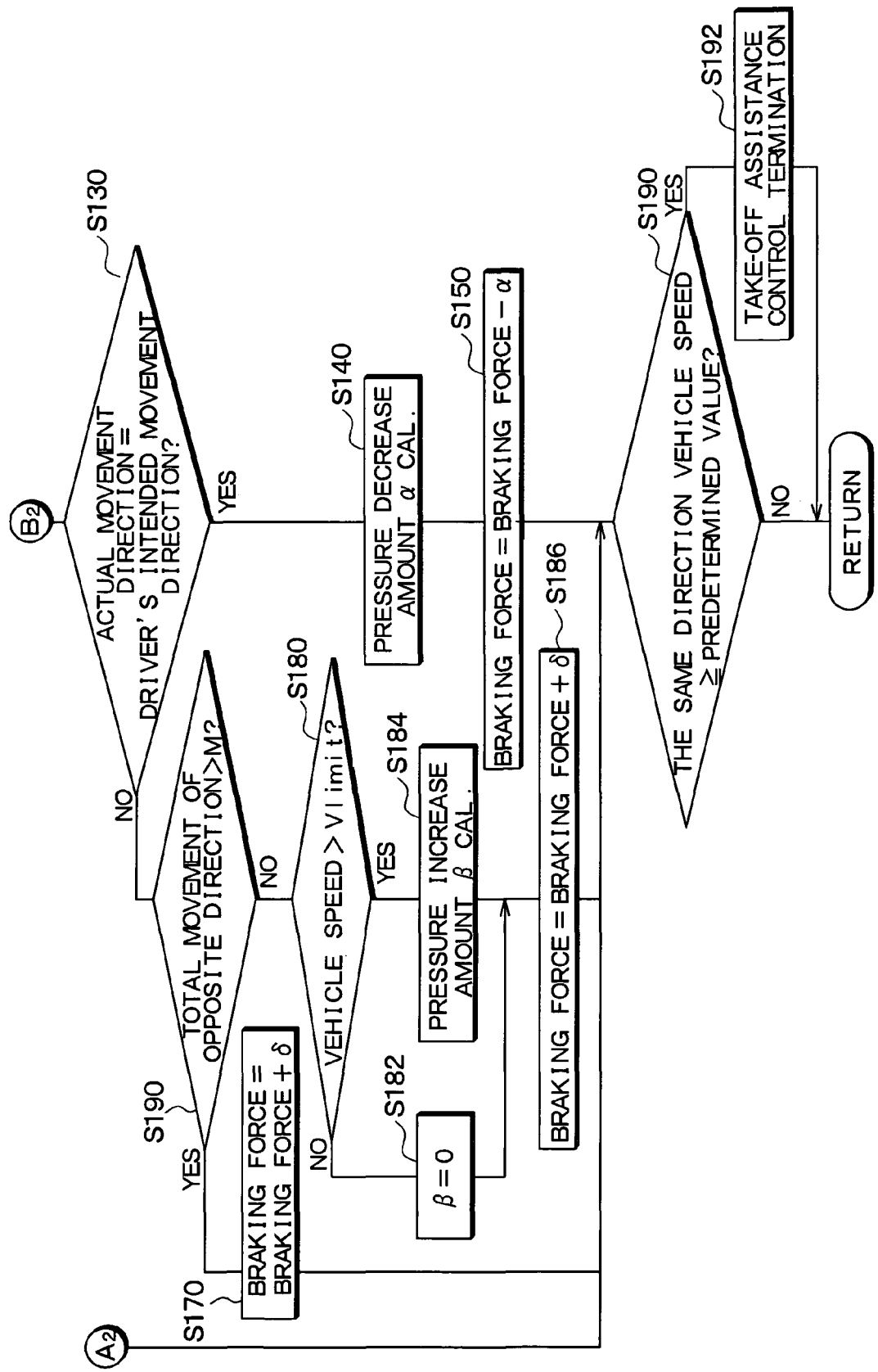
FIG. 12 is part of a flow diagram of a starting assistance control of a third embodiment according to the present invention.

FIGS. 10 and 12 illustrate the control flow of the starting assistance control in the third embodiment. That is to say the third embodiment executes the processing shown in FIG. 12 instead of the processing shown in FIG. 11 described in the second embodiment. Note that the processing for executing the same processing as those in the control flow (in FIGS. 4, 5, 10 and 11) of the first and second embodiments are designated with the same reference numerals and a description is omitted.

The processing in the control flow in the third embodiment (FIGS. 10 and 12) is repeated in a predetermined control cycle (e.g., at intervals of 5 ms to 10 ms) as in the case of the control flow in each of the aforementioned embodiments.

The third embodiment executes the same processing as those in the second embodiment described in FIG. 10 as far as processing at S127, at which point the initial pressure decrease mode terminates.

The third embodiment differs from the first and second embodiments with respect to the following points.

As a result of the determination at S130, the system switches to the opposite direction mode. Then at S160, it is determined whether or not the amount of movement in the opposite direction from the time of switching to the opposite direction mode (an amount of total movement in the opposite direction) exceeds a preset threshold M.

Then, if the amount of total movement in the opposite direction is equal to or less than the threshold M, as in the case of the first opposite direction mode in the first embodiment, a pressure increase amount β is calculated on the basis of the amount of deviation between the vehicle speed and the target speed through the processing from S180 to S186. Then, the braking force is increased in accordance with the calculated pressure increase amount β or the braking force is kept constant in order to prevent movement of the vehicle in the opposite direction.

On the other hand, if the amount of total movement in the opposite direction exceeds the threshold M, as in the case of the second opposite direction mode in the second embodiment, at S170, the value "start-of-movement braking force in the initial pressure decrease mode+δ" is set as the target braking force, and the braking force is increased (at S170) in order to prevent movement in the opposite direction and stop the vehicle.

As described above, in the third embodiment, as in the case of the foregoing first and second embodiments, the actual movement direction of the vehicle is detected in the initial pressure decrease mode. Then, if the detected actual movement direction is identical to the gear shift position of the transmission, which is the intended movement direction that the driver intends to move in, the same direction mode is selected. On the other hand, if the actual movement direction and the gear shift position are opposite, the opposite direction mode is selected.

Here, in the same direction mode, as in the case of the first and second embodiments, the braking force is decreased at a decrease gradient that is determined by the pressure decrease amount α according to the vehicle speed and the degree of accelerator opening. This makes it possible to start in the same direction, namely, in the direction in which the driver intends to start, at a speed that accords to the degree of accelerator opening.

On the other hand, with regard to the opposite direction mode, in the third embodiment, the first opposite direction mode is selected until the amount of movement in the opposite direction exceeds a predetermined value M. This is selected in order to increase the braking force on the basis of the increase gradient β according to the amount of deviation between the vehicle speed in the opposite direction and the target speed for deceleration of the vehicle. Then, when the amount of movement exceeds the value M, the second opposite direction mode is selected, and therefore it is possible to reliably stop the vehicle using a braking force that is larger than the start-of-movement braking force. Hence, for the movement of the vehicle in the opposite direction, the braking force is controlled in accordance with the amount of movement concerned. Accordingly, it is possible to implement smooth braking, without the driver feeling that something is wrong or feeling a sense of unease.

As described above, as in the case of the foregoing first and second embodiments, in the third embodiment it is also possible to perform a smooth starting operation of the vehicle in accordance with the intention of the driver in any halted state. This can be executed by controlling braking force in accordance with the orientation of the vehicle and the gradient direction of the sloping road, the driver's intended movement direction, and the degree of accelerator opening representing the magnitude of the starting intention. Accordingly, detection or estimation of the magnitude of the gradient of the sloping road is not necessary.

Fourth Embodiment

Next, an automatic brake device of a fourth embodiment according to the present invention will be described. The fourth embodiment is the same as the foregoing first, second and third embodiments with respect to the entire structure illustrated in FIG. 1, the structure of the hydraulic braking apparatus 2 illustrated in FIG. 2, and the processing in the main flow diagram illustrated in FIG. 3. Accordingly, a description of these elements and processing will be omitted here.

In the fourth embodiment, a starting assistance control flow executed by the brake control ECU 1 is different from those in the first to third embodiments. Therefore, the points of difference will be described below.

Figure 13:
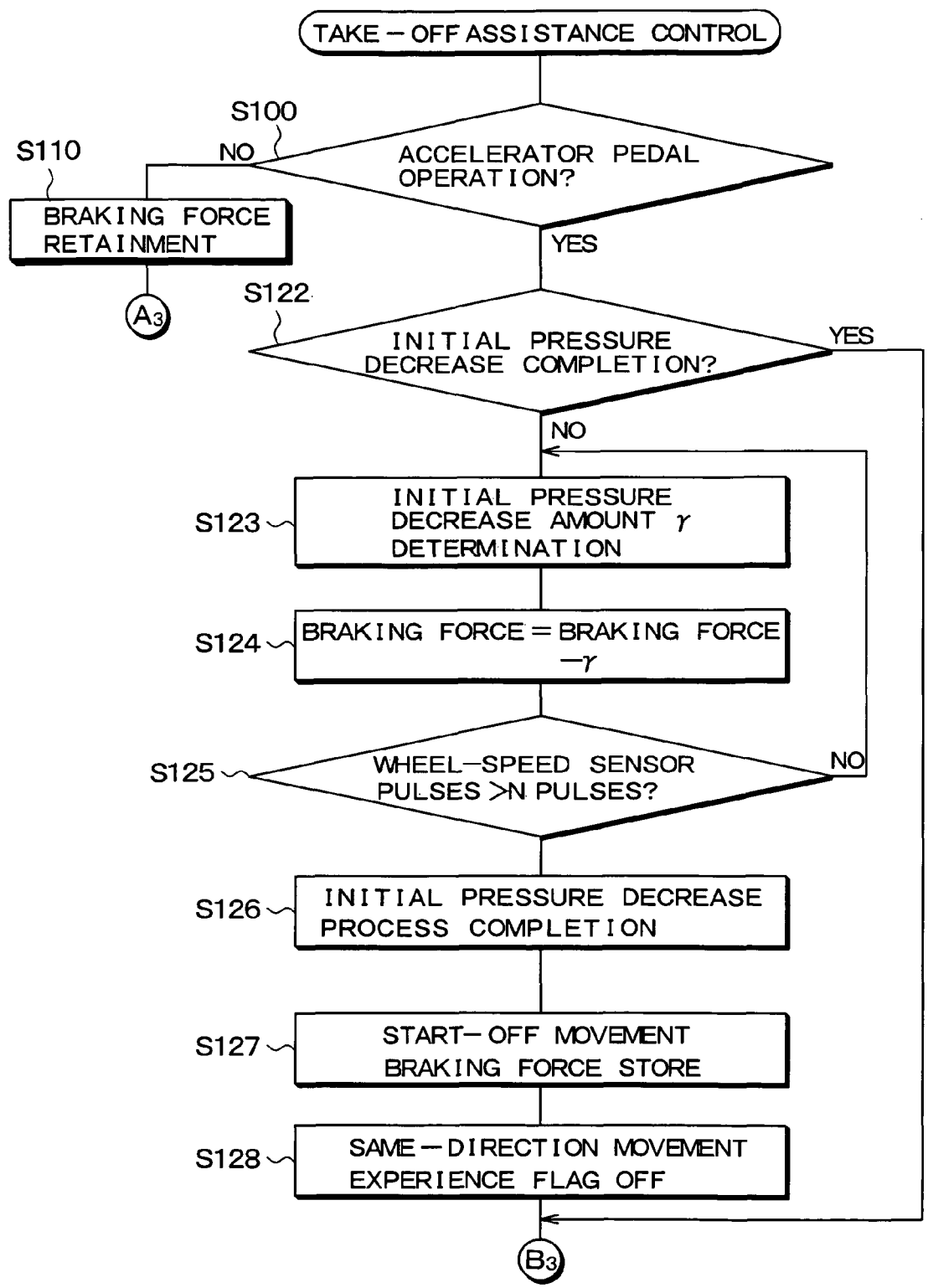
FIG. 13 is part of a flow diagram of a starting assistance control of a fourth embodiment according to the present invention.
Figure 14:
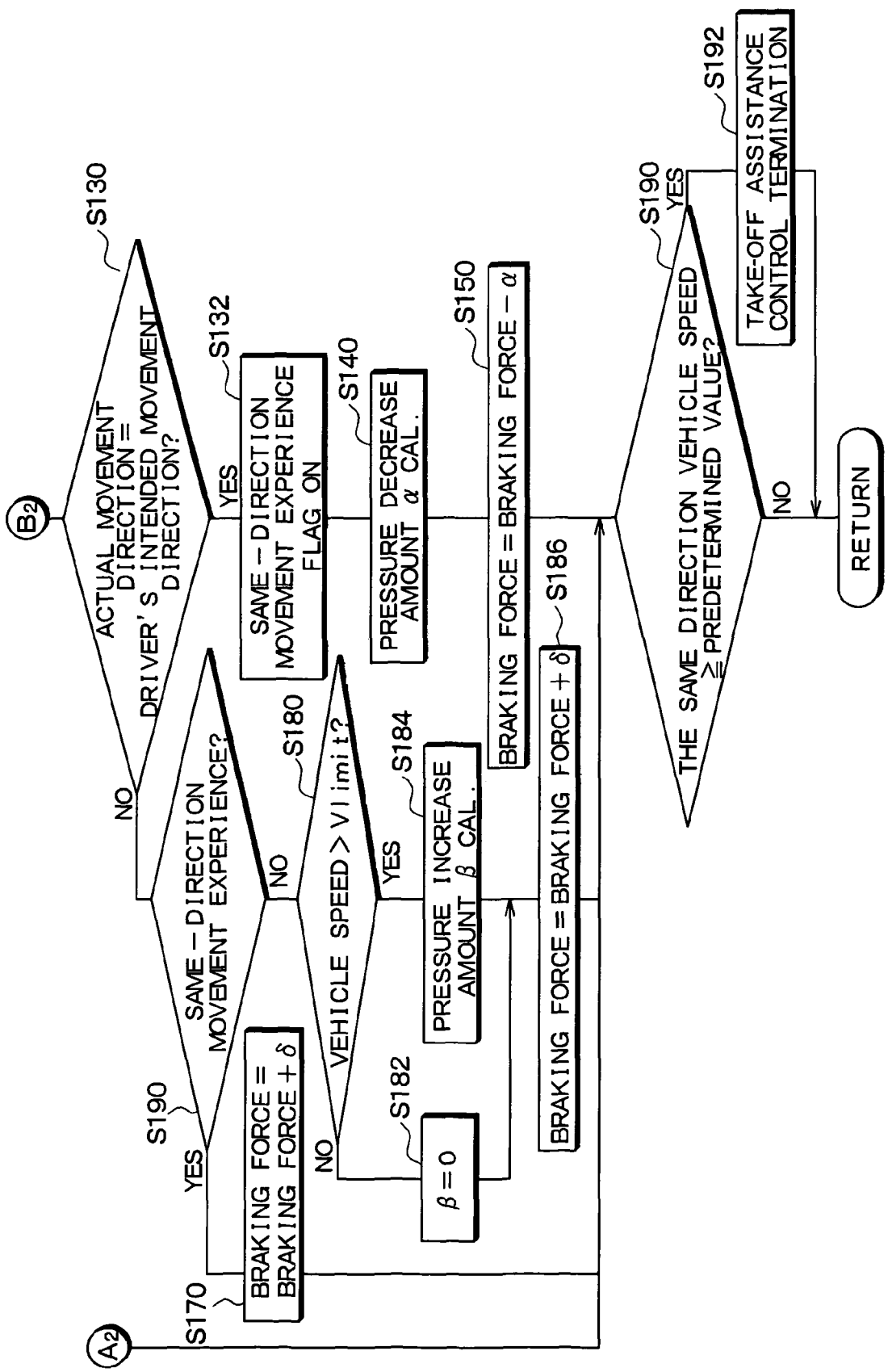
FIG. 14 is another part of the flow diagram of the starting assistance control of the fourth embodiment.

FIGS. 13 and 14 illustrate the control flow of the starting assistance control in the fourth embodiment. Note that the processing for executing the same processing as those in the control flows (in FIGS. 4, 5, 10, 11 and 12) of the first to third embodiments is denoted with the same reference numerals and a description is omitted.

The processing in the control flow in the fourth embodiment (FIGS. 13 and 14) is repeated with a fixed control cycle (e.g., at intervals of 5 ms to 10 ms) as in the case of the control flow in each of the aforementioned embodiments.

The fourth embodiment executes the same processing as those in the second and third embodiments described in FIG. 10 as far as processing at S127, at which point the initial pressure decrease mode terminates.

The fourth embodiment differs from the first to third embodiments with respect to the following points.

At the time of terminating the initial pressure decrease mode, the start-of-movement braking force at S127 is stored, and further, a same-direction movement experience flag is set to OFF at S128.

If the same direction mode is switched to as a result of the comparison between the actual movement direction and the intended movement direction at S130, at S132, the same-direction movement experience flag is switched to ON at first. Then processing from S140 to S150, a pressure decrease amount α defining a predetermined decrease gradient is calculated and a target braking force is set by use of the calculated pressure decrease amount α, as in the cases of the first to third embodiments.

On the other hand, if the opposite direction mode is switched to as a result of the determination at S130, at S162, determination as to whether movement in the same direction has been experienced is made on the basis of the state of the same-direction moving experience flag. If there is no experience of movement in the same direction, operation in the first opposite direction mode in the foregoing processing from S180 to S186 is executed. In the case that movement has been experienced, operation in the second opposite direction mode in the foregoing processing at S170 is executed.

The determination at S162 is based on whether movement in the same direction has been experienced or not. Therefore, if the number of experiences is zero, the first opposite direction mode is selected. If the number of experiences is one, the second opposite direction mode is selected.

It should be noted that, the determination at S162 may be designed such that when the number of experiences of movement in the same direction is less than n experiences, the first opposite direction mode may be selected, and when the number of experiences is equal to or larger than n experiences, the second opposite direction mode may be selected. In this case, at S132, the same-direction moving experience flag is set as a cumulative value number.

With regard to vehicle movement under the starting assistance control in the forth embodiment as described above, typical cases will be described using examples in which the vehicle is placed under various conditions.

(Case a) The driver wishes to move forward uphill (the intended movement direction=forward) or move backward downhill (the intended movement direction=backward):

As long as the accelerator pedal is not depressed, the procedure proceeds from S100 to S110, and therefore the braking force is held to maintain the halted state of the vehicle. Upon depression of the accelerator pedal, the initial pressure decrease mode (from S100 to S122) is switched to.

When the vehicle moves in the opposite direction to the intended movement direction due to an insufficient degree of accelerator opening in the initial pressure decrease mode, because the same-direction moving experience flag is OFF when the initial pressure decrease mode (at S128) is terminated, if the vehicle speed in the opposite direction is higher than the target speed V limit at S180, the braking force is increased (at S184). Then, eventually, the vehicle speed in the opposite direction becomes lower than the target speed, and then the braking force is maintained at S182.

After this, the vehicle speed in the opposite direction is gradually reduced by further depression of the accelerator pedal. After a while, the movement direction of the vehicle changes to the same direction and therefore the same direction mode is switched (the same-direction moving experience flag is switched to ON). In the same direction mode, the braking force gradually decreases (by the pressure decrease amount $\alpha$), and after a while the braking force is completely cancelled (the braking force=zero). Accordingly, the vehicle speed in the same direction is further increased.

Note that, termination of the starting assistance control does not occur at the time when the braking force is completely cancelled, but is set at the time point when the vehicle speed exceeds a predetermined value (e.g., 15 km/h or a vehicle speed proportional to the degree of accelerator opening).

Further, when the driver eases the pressure on the accelerator pedal before termination of the same direction mode, the actual movement direction of the vehicle changes from the same direction, to stopping, and then to the opposite direction. Hence, when moving from S130 to S162, the same-direction moving experience flag is ON, and therefore the procedure moves to S170 to set the target braking force at "start-of-movement braking force+$\delta$". Accordingly, vehicle movement in the opposite direction is stopped and at the same time the initial pressure decrease completion flag is switched to OFF in order to allow the initial pressure decrease processing of the next accelerator pedal operation.

(Case b) The driver wishes to move backward uphill (the intended movement direction=backward) or move forward downhill (the intended movement direction=forward):

The accelerator pedal is depressed in the halted state of the vehicle, whereupon the vehicle reliably moves in the intended movement direction in the initial pressure decrease mode, irrespective of the degree of accelerator opening. Hence, the same direction mode is switched to, and therefore the braking force is completely cancelled and the starting assistance control terminates. Furthermore, the vehicle moves in the intended movement direction at a speed corresponding to the degree of accelerator opening and the gradient of the sloping road.

Note that during operation in the same direction mode, namely, before the braking force is completely cancelled, if the accelerator pedal is released, the braking force at the point of accelerator release is maintained (from S100 to S110). However, engine output is at the minimum value generated when idling, so that the halted state or movement in the same direction is continued in accordance with the relationship between the road-surface gradient and the braking force and the engine output.

As described above, in the fourth embodiment, as in the cases of the foregoing first to third embodiments, the actual movement direction of the vehicle is detected in the initial pressure decrease mode. If the detected actual movement direction is identical with the gear shift position of the transmission representing the intended movement-direction that the driver intends to move in, the same direction mode is selected, whereas if the detected actual movement direction is opposite, the opposite direction mode is selected.

Further, in the same direction mode, as in the cases of the first to third embodiments, by decreasing the braking force at a decrease gradient which is defined by the use of the pressure decrease amount $\alpha$ that accords with the vehicle speed and the degree of accelerator opening, it is possible to start in the same direction, that is, the direction in which the driver intends to start, at a speed corresponding to the degree of accelerator opening.

On the other hand, with regard to the opposite direction mode, in the fourth embodiment, when the vehicle moves in the opposite direction, if movement in the same direction has not been experienced up to this time, or when the number of experiences is less than n experiences (e.g., n=1), the first opposite direction mode is selected to increase the braking force on the basis of the increase gradient $\beta$ that accords with the amount of deviation between the vehicle speed in the opposite direction and the target speed for deceleration of the vehicle. If the there has been experience of movement in the same direction, or if the number of experiences is equal to or more than n experiences, the second opposite direction mode is selected to enable reliable stopping of the vehicle using a braking force that exceeds the start-of-movement braking force. Accordingly, it is possible to reliably stop the vehicle under conditions in which the sequence of movements from a same-direction movement to an opposite-direction movement and then to a same-direction movement is repeated. It is further possible to execute smooth braking without the driver feeling that something is wrong or feeling a sense of unease.

As described above, in the fourth embodiment, as in the case of the foregoing first, second and third embodiments, it is possible to execute a smooth starting operation of the vehicle in any halted state in accordance with the intention of the driver. This can be executed by controlling braking force in accordance with the orientation of the vehicle and the gradient direction of the sloping road, the driver's intended movement direction, and the degree of accelerator opening representing the magnitude of the starting intention. Accordingly, detection or estimation of the magnitude of the gradient of the sloping road is not necessary.

Fifth Embodiment

Next, an automatic brake device of a fifth embodiment according to the present invention will be described. The fifth embodiment is the same as the foregoing first to fourth embodiments with respect to the entire structure illustrated in FIG. 1, the structure of the hydraulic braking apparatus 2 illustrated in FIG. 2, and the processing in the main flow diagram illustrated in FIG. 3. Accordingly a description of these elements and processing will be omitted here.

In the fifth embodiment, the brake control ECU 1 executes a starting assistance control flow that is different from those in the first to fourth embodiments. Therefore, the points of difference will be described below.

Figure 4:
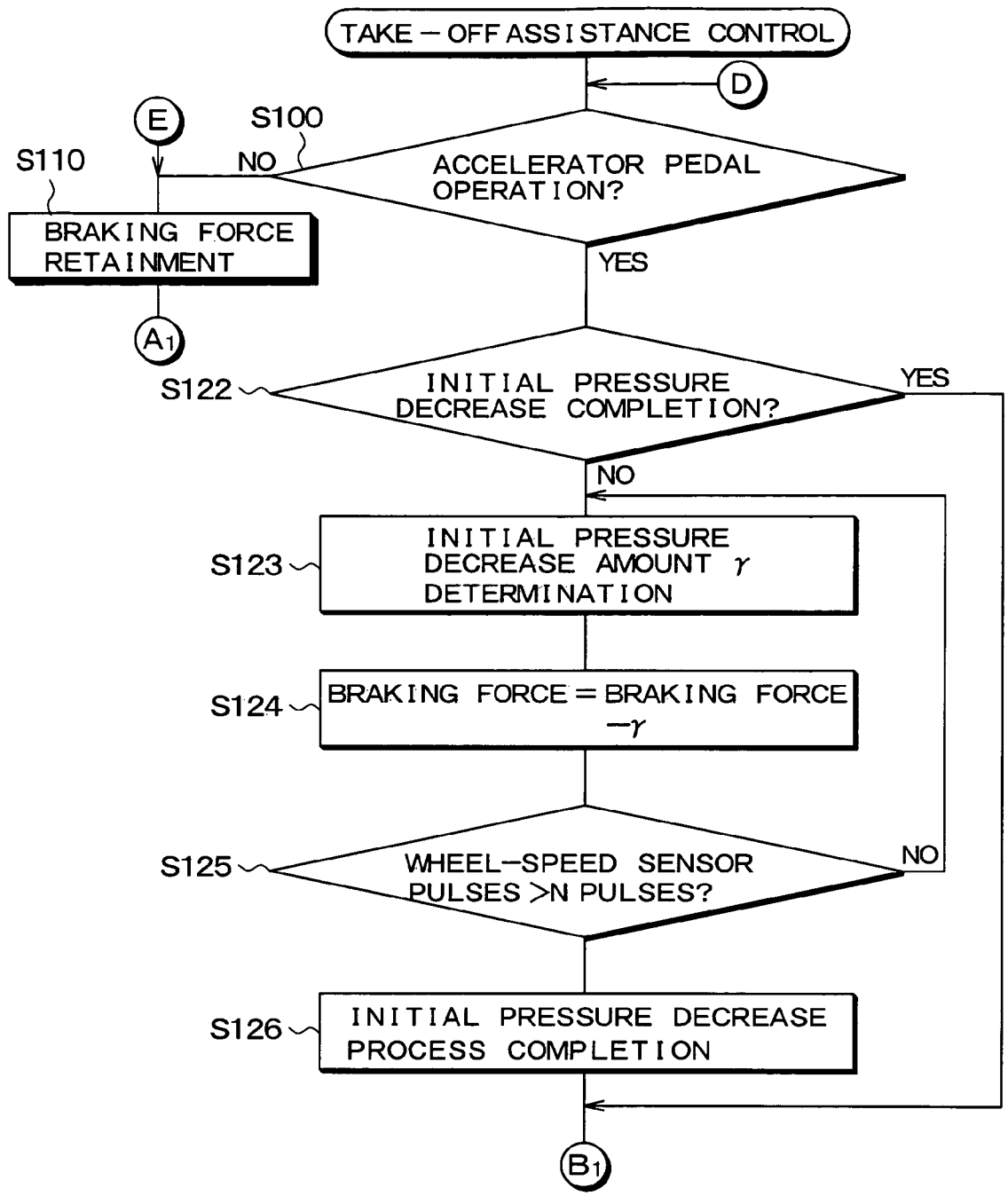
FIG. 4 is part of a flow diagram of a starting assistance control of the automatic brake device according to the first embodiment.
Figure 5:
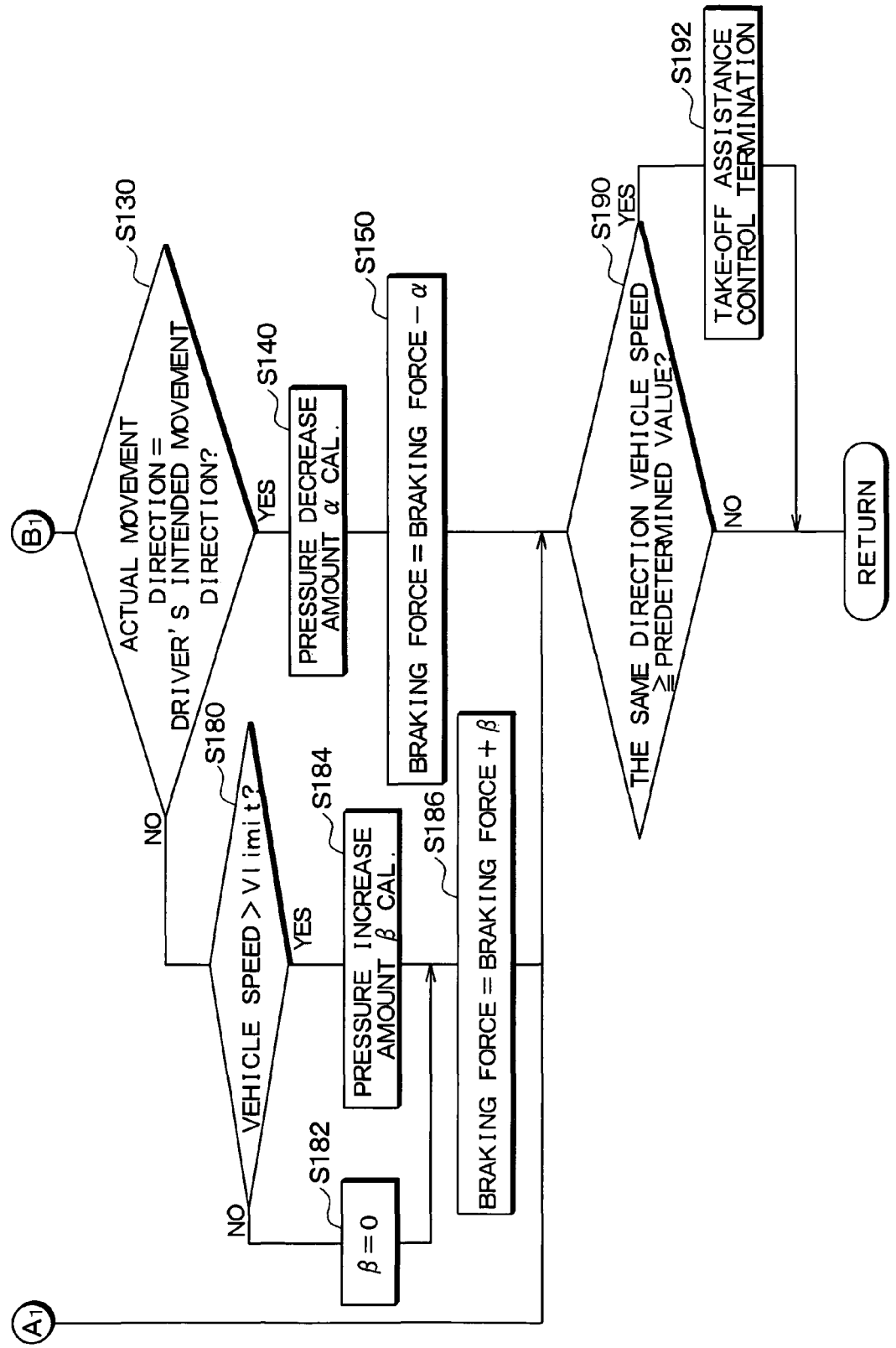
FIG. 5 is another part of the flow diagram of the starting assistance control of the automatic brake device according to the first embodiment.
Figure 15:
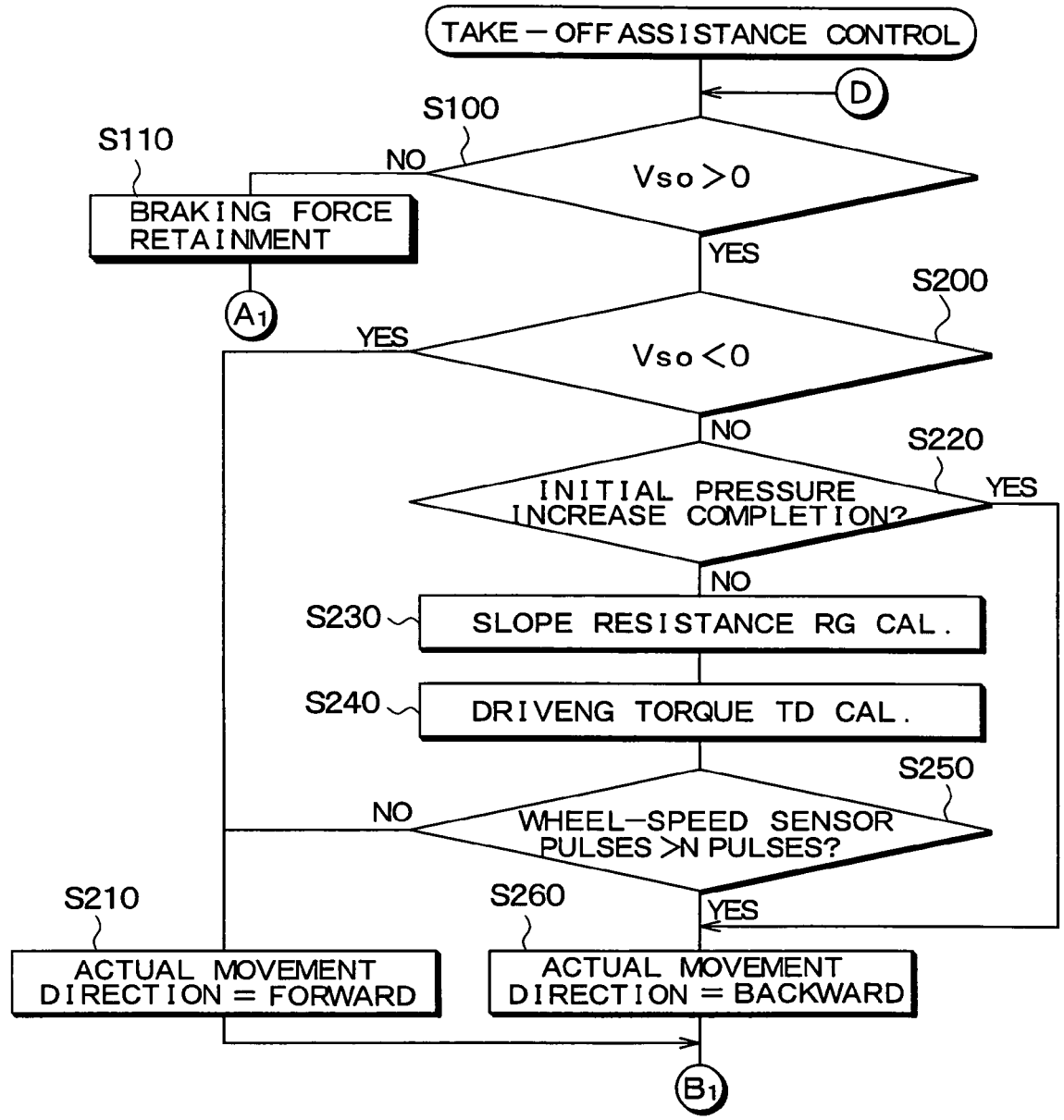
FIG. 15 is part of a flow diagram of a starting assistance control of a fifth embodiment according to the present invention.

FIGS. 15 and 5 illustrate the control flow of the starting assistance control in the fifth embodiment. Note that the processing for executing the same processing as those in the control flow (in FIGS. 4, 5, 10, 11, 12, 13 and 14) of the first to fourth embodiments are denoted with the same reference numerals and a description is omitted.

The processing in the control flow in the fifth embodiment (FIGS. 15 and 5) is repeated with a predetermined control cycle (e.g., at intervals of 5 ms to 10 ms) as in the case of the control flow in each of the aforementioned embodiments.

In the fifth embodiment, in the movement direction detection mode for detecting the movement direction of the vehicle, the movement direction of the vehicle is not detected by use of initial pressure decrease as is done in the first to fourth embodiments. Instead, the movement direction of the vehicle is detected by use of the vehicle speed itself which is generated in accordance with the applied braking force and the surface gradient of the road on which the vehicle stops, and with the degree of accelerator opening.

Note that in the fifth embodiment, a vehicle speed Vs0 is calculated by the brake control ECU 1 on the basis of signals from the wheel speed sensors 5, and is represented as a positive value in the forward direction of the vehicle and as a negative value in the backward direction thereof.

First, upon determination that the accelerator pedal is being operated at S100, it is determined at S200 whether or not a vehicle speed Vs0 has a positive value. If YES, at S210, the actual movement direction of the vehicle is set as the forward direction. If NO, the procedure moves to S220.

At S220, it is determined whether or not the vehicle speed Vs0 has a negative value. If YES, at S260, the actual movement direction of the vehicle is set as the backward direction. If NO, the procedure moves to S230. In this event, the vehicle speed Vs0 is equal to zero.

In this manner, the above processing in the fifth embodiment corresponds to a movement direction detecting unit for detecting the actual movement direction on the basis of a wheel speed signal of the vehicle that is moved by the accelerator pedal operation which represents the driver's starting intention.

At S230, because the vehicle speed Vs0=zero, a slope resistance RG is calculated on the basis of Equation 3.

$$RG = W \times gx0 \quad (3)$$

where, W is the preset weight of the vehicle VL, and gx0 is the acceleration of the vehicle in the backward-and-forward direction as detected by the backward-and-forward acceleration sensor 9, in which the orientation of the rear of the vehicle is positive.

That is, when stopping the vehicle on a sloping road, the value detected by the backward-and-forward acceleration sensor 9 is equivalent to a hill slope direction component of the gravitational acceleration acting on the vehicle, and stands at gx0>zero when the vehicle stops on an uphill slope, gx0=zero when the vehicle stops on a level road, and gx0<zero when the vehicle stops on a downhill slope. Accordingly, it is possible to use Equation 3 for the calculation of a force in the hill slope direction acting on the vehicle in the halted state, i.e. the hill resistance.

Then, at S240, a driving torque TD acting on the driving wheels is calculated using Equation 4 on the basis of the engine output generated through the accelerator pedal operation by the driver.

$$TD = Te \times tAT \times rAT \times rf \quad (4)$$

where, Te is the engine torque, tAT is the torque ratio of the automatic transmission (AT), rAT is a gear ratio of AT, and rf is a differential gear ratio. The AT gear ratio rAT is set at rAT>zero when the shift position of the transmission is placed in the forward direction range (the D range, the 2 range or the L range), set at rAT=zero when the shift position is placed in a halted state range (the P range or the N range), and set at rAT<zero when the shift position is placed in the reverse direction range (the R range).

Accordingly, the driving torque TD when the vehicle generates a driving force in the forward direction has a positive value (TD>zero) and the driving torque TD in the backward direction has a negative value (TD<zero).

At S250, a comparison between the calculated hill resistance RG and the calculated driving torque TD is executed. If RG>TD, the actual movement direction is determined to be the backward direction at S260. If RG≦TD, the actual movement direction is determined to be the forward direction at S210.

The determination conditions at S250 for each of the individuals situations are as follows.

(i) In the case of being stopped uphill, when the shift position is placed in the backward range (the R range) and driving torque is generated, the vehicle tends to move backward. Further, regardless of the magnitudes of RG and TD, the relationships, RG>zero and TD<zero, that is, the relationship, RG>zero>TD is fulfilled at all times. As a result, it is possible to consider the actual movement direction as the backward direction.

(ii) In the case of being stopped downhill, when the shift position is placed in the forward range (the D range, the 2 range or the L range) and driving torque is generated, the vehicle tends to move forward. Further, regardless of the magnitudes of RG and TD, the relationships, RG<zero and TD>zero, that is, the relationship of RG<zero<TD is established at all times. As a result, it is possible to consider the actual movement direction as the forward direction.

(iii) In the case of being stopped uphill, when the shift position is placed in the forward range and driving torque is generated, RG>zero and TD>zero are established. Hence, depending upon the magnitude of the values of RG and TD, the vehicle tends to move backward when RG>TD (>zero), and to move forward when (zero≦)≦RG<TD.

(iv) In the case of being stopped downhill, when the shift position is placed in the backward range (the R range) and driving torque is generated, RG<zero and TD<zero are satisfied. Hence, depending upon the magnitude of the values of RG and TD, the vehicle tends to move backward when (zero>) RG>TD, i.e., |RG|<|TD|, and to move forward when RG<TD (<zero), i.e., |RG|>|TD|.

With regard to the foregoing, in the processing from S200 to S260 (the movement direction detection mode), while the vehicle is actually moving, that is, when the vehicle speed Vs0 is a positive value or a negative value, the actual movement direction of the vehicle is determined as the forward direction or the backward direction in a corresponding manner. Furthermore, when the vehicle is in a halted state, that is, when the vehicle speed Vs0 is zero, the actual movement direction is taken to be the forward direction or the backward direction through comparison of the magnitude, including positive and negative sign, of the hill resistance RG and the driving torque TD.

Then, after processing at S210 or at S260, as in the cases of the aforementioned embodiments, at S130, a comparison between the determined actual movement direction of the vehicle and the intended movement direction represented by the shift position is executed. If the comparison result is YES, the procedure enters the same direction mode that is executed at S140 onward. If the result is NO, the procedure enters the first opposite direction mode as executed at S180 onward. The processing in the same direction and first opposite direction modes are the same as those in the first embodiment, and thus a description will be omitted here.

As described above, in the fifth embodiment, it is possible in the movement direction detection mode to determine that the vehicle is moving in the forward direction or that the vehicle is moving in the backward direction from the magnitude of the vehicle speed detected through the actual movement of the vehicle, i.e., to determine the actual movement direction of the vehicle.

Further, even if the vehicle speed is zero, by calculating and comparing the hill resistance RG and the driving torque TD on the basis of the driving torque of the wheels, it is possible to determine whether the vehicle is about to move forward or backward, and to take the result as the actual movement direction. During operation in the starting assistance control mode, operation in the above movement direction detection mode is executed at all times in order to detect and determine the actual movement direction of the vehicle.

Then, based on the relationship between the actual vehicle movement direction determined as described above and the intended movement direction, as in the case of the first embodiment, if both the actual vehicle-movement and the intended movement directions are identical with each other, it is possible to decrease the braking force gradually at the decrease gradient α, and execute starting at a speed corresponding to the accelerator pedal operation (the same direction mode).

Further, if the actual vehicle-movement and the intended movement directions are opposite, when the vehicle speed is higher than the target speed, the braking force is gradually increased at the predetermined increase gradient β in order to make the vehicle speed agree with the target speed. When the vehicle speed is lower than the target speed, the braking force is maintained at a constant value without change in order for the vehicle to switch from deceleration to the halted state (the first opposite direction mode).

When the vehicle is placed in the halted state in the first opposite direction mode, the actual movement direction is re-determined through operation in the movement direction detection mode. Based on the result of this determination, either the same direction mode or the first opposite mode is selected. Then, the vehicle moves at a speed that corresponds with the amount of accelerator pedal operation of the driver (the degree of accelerator opening), the braking force applied by the automatic brake device and the hill resistance.

Accordingly, with the fifth embodiment it is also possible to perform smooth starting operation of the vehicle in any halted state in accordance with the intention of the driver. This can be executed by controlling braking force in accordance with the orientation of the vehicle and the gradient direction of the sloping road, the driver's intended movement direction, and the degree of accelerator opening representing the magnitude of the starting intention.

Sixth Embodiment

Next, an automatic brake device of a sixth embodiment according to the present invention will be described. The sixth embodiment is the same as the foregoing first to fifth embodiments with respect to the entire structure illustrated in FIG. 1, the structure of the hydraulic braking apparatus 2 illustrated in FIG. 2, and the processing in the main flow diagram illustrated in FIG. 3. Accordingly, a description of these elements and processing will be omitted here.

In the aforementioned first to fifth embodiments, examples are illustrated in which the braking force generated by the hydraulic braking apparatus 2 serving as the first brake unit is used for maintaining the halted state of the vehicle before starting. However, in the sixth embodiment, the automatic brake device switches in the halt-maintenance mode from the halted state of the vehicle retained by the motor-operated PKB 3 serving as the second brake unit to the halted state of the vehicle maintained by the hydraulic braking apparatus 2 serving as the first brake unit, just before starting of the vehicle.

Accordingly, in the main flow (FIG. 3), when the brake holding control at S13 is initiated, the vehicle VL is placed in the halt-maintenance state by the second braking force generated by the motor-operated PKB 3.

Figure 16:
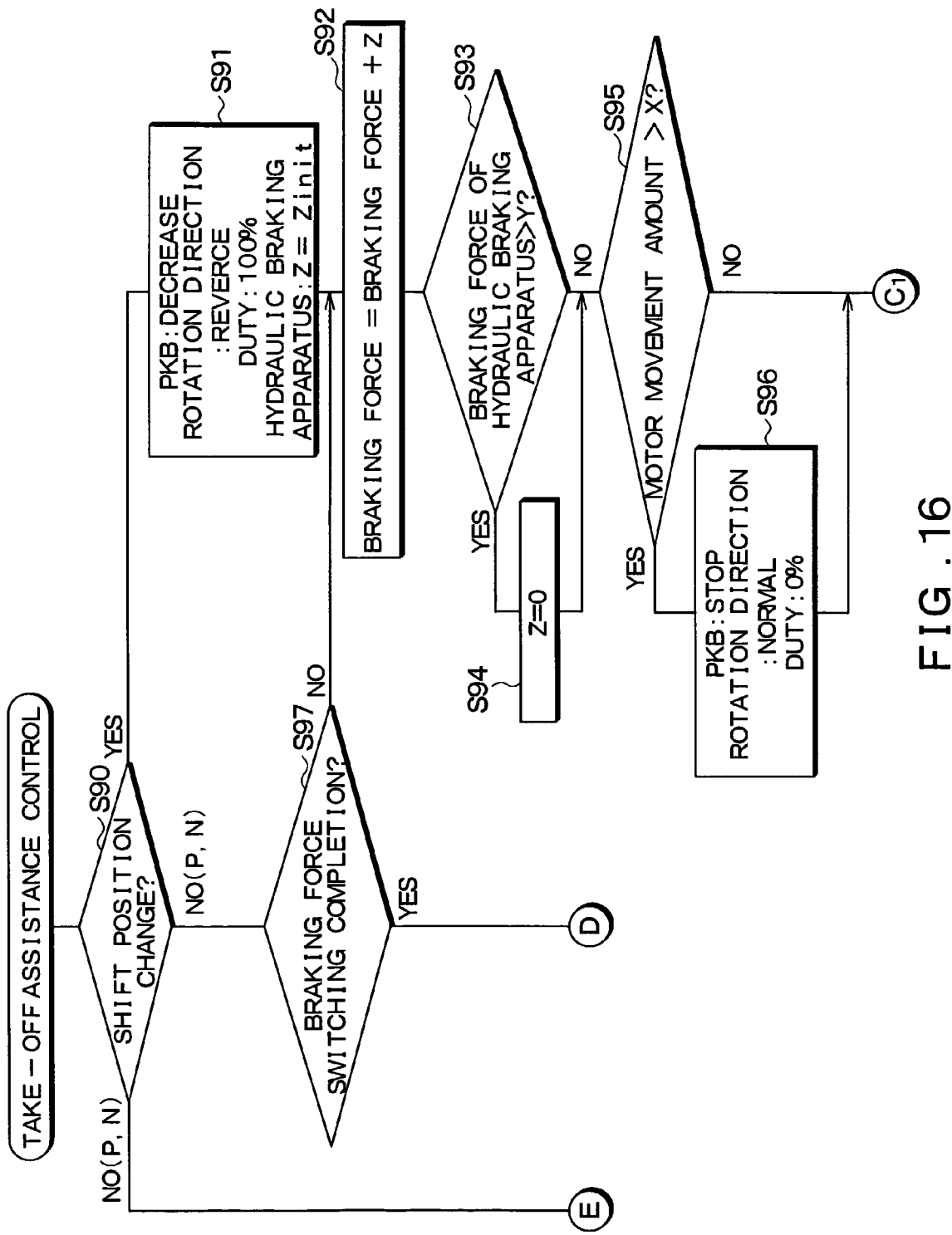
FIG. 16 is part of a flow diagram of a starting assistance control of a sixth embodiment according to the present invention.

FIGS. 16, 4 and 5 illustrate the control flow of the starting assistance control executed by the brake control ECU 1 according to the sixth embodiment. Note that the processing for executing the same processing as those in the control flow (in FIGS. 4, 5, 10, 11, 12, 13 and 14) of the first to fifth embodiments is denoted by the same reference numerals and a description is omitted here.

The processing in the control flow in the sixth embodiment (FIGS. 16, 4 and 5) is repeated with a predetermined control cycle (e.g., at intervals of 5 ms to 10 ms) as in the case of the control flow in each of the aforementioned embodiments.

First, at S90, it is determined whether or not the driver shifts the shift position of the transmission. The shifting of the shift position is detected by the shift position sensor 8.

If the shift position is not shifted, specifically, if the transmission is not shifted and remains in a shift position (the P range or the N range) in which driving force does not act on the wheels, the procedure moves to S110 (FIG. 4) in order to maintain the braking force at that time.

If the shift position is not shifted, specifically, if the transmission is not shifted and remains in a shift position (the D, 2, L or R ranges) in which driving force acts on the wheels, the procedure moves to S97.

Further, if the shift position is shifted, specifically, if the transmission is shifted from a shift position in which driving force does not act on the wheels to a shift position in which driving force does act on the wheels, the procedure moves to S91.

Note that the determination conditions at S90 may be set such that: if a switch signal of a brake lamp (not shown) that illuminates in response to the brake pedal operation remains ON (a turned-on state), it is taken that the driver does yet intend to start, and therefore the procedure moves to S110; if the switch signal remains OFF (a turned-off state), it is taken that that the accelerator pedal is operated on the basis of the starting intention, and therefore the procedure moves to S97; and if the switch signal is changed from ON to OFF, it is taken that the driver has just decided to start, and therefore the procedure goes to S91.

Further the determination conditions at S90 may include, for example, a determination as to whether the driver actuates a halt-maintenance cancel preparation switch (not shown) provided on the instrument panel, or elsewhere, in the vicinity of the driver's seat. That is to say, if such a halt-maintenance cancel preparation switch remains OFF, the procedure moves to S110, but if the switch remains ON, the procedure moves to S97, and if the switch is changed from OFF to ON, the procedure moves to S91.

Accordingly, the shift position sensor 8, or the switch for the brake lamps, or the halt-maintenance cancel preparation switch are equivalent to a starting preparation intention detection unit of the present invention.

At S91, settings are established for decreasing the braking force of the motor-operated PKB 3 and increasing the pressure for the braking force of the hydraulic braking apparatus 2. Specifically, the motor of the motor-operated PKB 3 is rotated in the reverse direction at a 100% duty ratio (the maximum number of revolutions), and also a pressure increase amount Z is set as a predetermined value Z in it.

Then, at S92, a value resulting from the addition of the above set pressure increase amount Z is set as the target value for the braking force (first braking force) of the hydraulic braking apparatus 2.

At S93, it is determined whether or not the braking force generated by the hydraulic braking apparatus 2 and detected by the fluid-pressure sensors 19a, 19b, 29a and 29b exceeds a value Y corresponding to the braking force initially generated by the motor-operated PKB 3. If the result is YES, pressure increase is not required. Hence, at S94, the target braking force Z is set as zero. If the result is NO, the procedure moves to S95.

At S95, it is determined whether or not the motor-operated PKB 3 is completely cancelled. Specifically, a position at which the motor of the motor-operated PKB 3 is returned from a locked position (corresponding to a maximum braking force) by a predetermined amount X is taken as a braking-force removed position. In this case, it is determined that the braking force is removed if the amount of return of the motor exceeds the predetermined amount X. Then, if the motor-operated PKB 3 is cancelled, the procedure moves to S96 to actuate stopping of the motor-operated PKB 3, that is, normal direction rotation of the PKB 3 at a 0% duty ratio. Then, the processing in the control flow are continued.

At S95, when the motor-operated PKB 3 is completely cancelled, the processing is continued without change.

On the other hand, at S97, it is determined whether or not the braking force is switched completely from the motor-operated PKB 3 to the hydraulic braking apparatus 2. That is, if the first braking force generated by the hydraulic braking apparatus 2 reaches a braking force equivalent to the original braking force (the second braking force) of the motor-operated PKB 3, and further, if the second braking force generated by the motor-operated PKB 3 is completely removed, then the determination becomes YES. Namely, it is taken that switching is completed, and the procedure moves to S100 in FIG. 4.

Further, if the determination result at S97 is NO, namely, when switching is not yet completed, the procedure moves to S92 to execute pressure increase for the hydraulic braking apparatus 2. Note that, at this point, once the release of the braking force of the motor-operated PKB 3 is set at S91, the motor is continuously rotated in the reverse direction, until the braking force of the motor-operated PKB 3 is completely removed.

Next, a description will be given concerning the manner in which the braking force from the motor-operated PKB 3 serving as the second brake unit is switched to the braking force from the hydraulic braking apparatus 2 serving as the first brake unit, with reference to the time diagram in FIG. 17.

Figure 17:
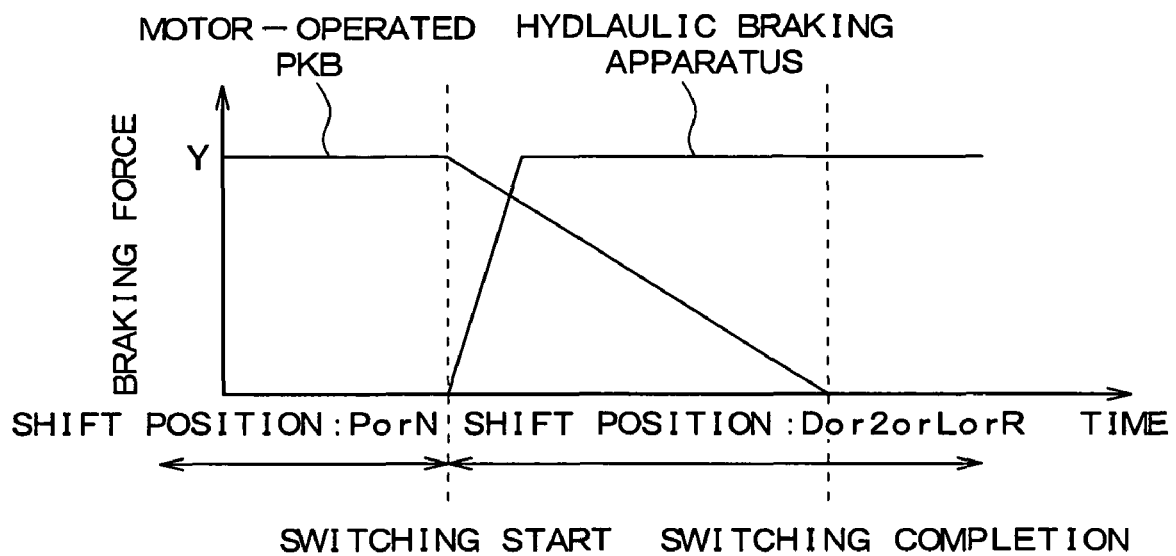
FIG. 17 is a line diagram illustrating a switching condition of a braking force that accords with switching of a shift position in a halt-maintenance mode according to the sixth embodiment.

When the shift position is shifted at the "switching start" point on the time axis of FIG. 17, the second braking force generated by the motor-operated PKB 3 up to this point is decreased at a predetermined time gradient due to the setting executed at S91.

Meanwhile, the first braking force generated by the hydraulic braking apparatus 2 increases in accordance with the pressure increase amount Z at S92 from the "switching start" point until it reaches the level Y equivalent to the braking force originally generated by the motor-operated PKB 3, namely, the braking force generated by the PKB 3 just before the time of the "switching start".

After the first braking force generated by the hydraulic braking apparatus 2 has reached a predetermined value Y, the second braking force generated by the motor-operated PKB 3 continues to decrease relatively moderately, as a result of factors related to the mechanism of the PKB 3. Finally, the second braking force decreases to zero, whereupon "completion of switching" is determined.

After "completion of switching", the processing from S100 (FIG. 4) onward is initiated for the starting assistance control.

Note that in the starting assistance control, when the actual movement direction differs from the intended movement direction, as in the case of the foregoing first embodiment, as a result of operation in the first opposite direction mode, control is executed such that if the vehicle speed exceeds the target speed V limit, the first braking force generated after switching by the hydraulic braking apparatus 2 serving as the first brake unit is increased in order to decrease the vehicle speed to make it equal to or lower than the target speed.

As described hitherto, in the sixth embodiment, the halt-maintenance state of the vehicle before starting is maintained by the motor-operated PKB 3 which serves as the second brake unit and which has low energy consumption. Then, in accordance with the shifting of the gear shift position which represents the starting preparation intention of the driver, generation of the braking force is switched from the motor-operated PKB 3 to the first brake unit 2, and the halt-maintenance state is continued.

Following this, the starting assistance control is executed. In this starting assistance control, the actual movement direction of the vehicle is detected by means of the initial pressure decrease, in response to the accelerator pedal operation representing the driver's starting intention, and then the actual movement direction is compared with the intended movement direction representing the driver's intention. After this, it becomes possible to start smoothly through operation in the same direction mode or the first opposite direction mode. Alternatively, it is possible to moderately decrease the movement of the vehicle in the opposite direction in order to eventually start in the intended movement direction. During the starting assistance control, the hydraulic braking apparatus 2 adjusts the braking force. This makes swift control of the braking force possible, leading to a smooth starting operation that conforms with the driver's intention.

Seventh Embodiment

Next, an automatic brake device of a seventh embodiment according to the present invention will be described. The seventh embodiment is the same as the foregoing first to sixth embodiments with respect to the entire structure illustrated in FIG. 1, the structure of the hydraulic braking apparatus 2 illustrated in FIG. 2, and the processing in the main flow diagram illustrated in FIG. 3. Accordingly, a description of these elements and processing will be omitted here.

In the aforementioned first to fifth embodiments examples are given in which the halt-maintenance state of the vehicle before starting is realized by the braking force generated by the hydraulic braking apparatus 2 serving as the first brake unit. However, in the seventh embodiment, the halt-maintenance state in the halt-maintenance mode is realized by the second braking force generated by the motor-operated PKB 3 serving as the second brake unit. Moreover, when the driver conducts operations for starting of the vehicle, the second braking force is decreased without delay in order to start movement of the vehicle.

Therefore, in the main flow (FIG. 3), when the brake holding control at S13 is initiated, the halted state of the vehicle is maintained by the second braking force generated by the motor-operated PKB 3.

Figure 18:
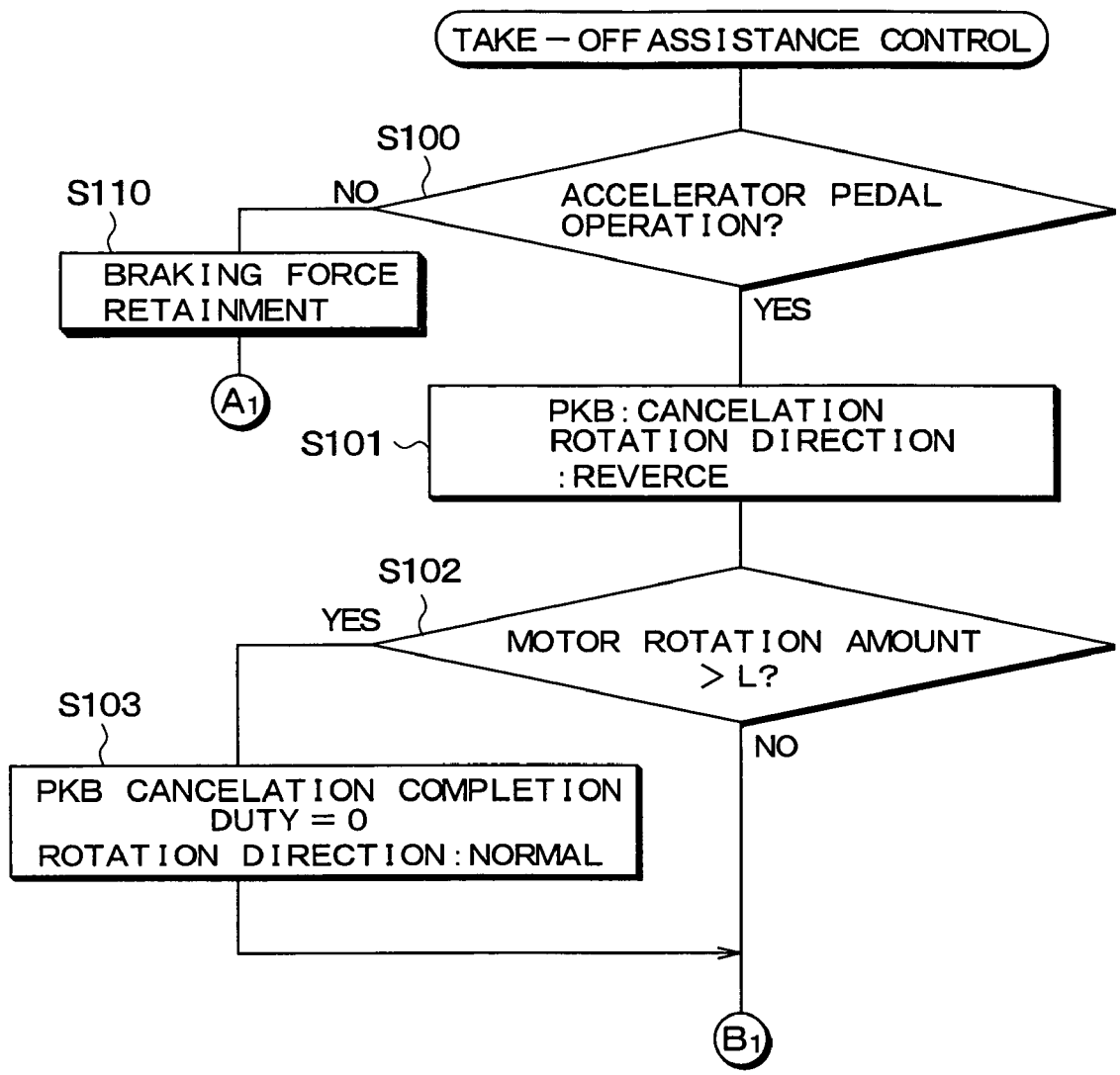
FIG. 18 is part of a flow diagram of a starting assistance control of a seventh embodiment according to the present invention.

FIGS. 18 and 5 illustrate the control flow of the starting assistance control executed by the brake control ECU 1 in the seventh embodiment. Note that the processing for executing the same processing as those in the control flow (in FIGS. 4, 10, 11, 12, 13, 14, 15 and 16) of the first to sixth embodiments is designated by the same reference numerals and a description is omitted.

The processing in the control flow in the seventh embodiment (FIGS. 18 and 5) is repeated with a predetermined control cycle (e.g., at intervals of 5 ms to 10 ms) as in the case of the control flow in each of the aforementioned embodiments.

At S100, it is determined whether or not the driver is operating the accelerator pedal as a representation of the driver's starting intention. If NO, the procedure moves to S110 to retain the present braking force (the first or second braking force) without change. Alternatively, if YES, the procedure moves to S101.

At S101, setting for the removal of the braking force of the motor-operated PKB 3 is executed. Specifically, a duty ratio DUTY which is an actuating signal (the second actuating signal) for the motor of the motor-operated PKB 3 is determined from Equation 5 as a value proportional to the degree of accelerator opening and a command continuation time for release of the motor-operated PKB 3.

$$DUTY = B1 \times \text{the degree of accelerator opening} + B2 \times \text{command continuation time} \quad (5)$$

where B1, B2 are proportionality constants.

Then, at S102, if the amount of motor rotation from the locked position (the maximum braking force) of the motor of the motor-operated PKB 3 reaches the predetermined value L, it is determined that the second braking force of the motor-operated PKB 3 is completely cancelled. That is, if the determination result is YES, the procedure moves to S103. If the determination is NO, the process is continued.

At S103, as a result of the cancellation determination, DUTY is set at zero and the rotation of the motor is set in the normal direction to complete the operation of cancellation the motor-operated PKB 3.

As a result of the processing at S103, the second braking force of the motor-operated PKB 3 is completely cancelled.

It should be noted that, at the time immediately after the accelerator pedal operation, due to the processing at S103, the hydraulic braking apparatus 2 does not generate the first braking force, so that no braking force is applied to the wheels. Thus the vehicle starts moving at a speed that accords to the relationship between the amount of accelerator pedal operation (the degree of accelerator opening) and the hill resistance.

The processing at S101, S102, S103 corresponds to the movement direction detection mode.

Then, the processing of the starting assistance control at S130 onward is performed in the same direction mode or the first opposite direction mode, as in the case of the aforementioned first embodiment. Hence the vehicle is capable of executing smooth starting in the intended movement direction.

Note that when the initial braking force of the hydraulic braking apparatus 2 is zero, there is no need for the pressure decrease processing of the braking force in the same direction mode to be executed, and thus the braking force remains substantially unchanged at zero.

Further, in the pressure increase processing for the braking force in the first opposite direction mode, when the initial braking force of the hydraulic braking apparatus is zero, the pressure is gradually built up from zero by the pressure increase amount β, in order to control the movement of the vehicle in the opposite direction.

In this way, in the seventh embodiment, when the halted state of the vehicle is maintained by the second braking force generated by the motor-operated PKB 3 serving as the second brake unit in the halt-maintenance mode, if the driver operates the accelerator pedal with the starting intention in the intended movement direction, cancellation of the second braking force of the motor-operated PKB 3 is immediately set. Then, a direction of the vehicle's movement in accordance with the degree of accelerator opening during the processing of cancellation the second braking force is detected as the actual movement direction.

In addition, as in the case of the foregoing first embodiment, it is possible to start in the intended movement direction due to the operations of the same direction mode and the first opposite direction mode in accordance with the relationship between the detected actual movement direction and the intended movement direction which is detected from the shift position.

In consequence, in the seventh embodiment, the braking force is controlled in accordance with the orientation of the vehicle and the direction of the gradient of the sloping road, and with the driver's intended movement direction and the degree of accelerator opening which represents the magnitude of the starting intention. This control also makes it possible to perform a smooth starting operation of the vehicle in accordance with the driver's intention without detection or estimation of the magnitude of the gradient of the sloping road.

Other Embodiments (1) Each of the foregoing embodiments has described an example of using the hydraulic braking apparatus 2 illustrated in FIG. 2 for the first brake unit that acts as the braking-force application unit. However, it is also possible to use a brake device which is capable of applying pressure to a master cylinder with a brake pedal pressure in the conventional way, and also capable of using another hydraulic mechanism to apply pressure to the master cylinder independently of the brake pedal pressure, that is, a so-called hydro-booster which is capable of applying pressure to a master cylinder even without brake pedal operation.

Further, the first brake unit is not limited to a hydraulic brake device, and a motor-operated brake unit may be used in which an electric motor is provided in each wheel and a brake caliper is directly pressed against a brake disc by driving the electric motor to generate a braking force.

It is possible for any of the above brake devices to generate the first braking force based on an actuating signal, and to function as the first brake unit allowing cancel of the braking force (braking force=zero) when the actuating signal becomes inactive. Accordingly, highly responsive generation of braking force is possible.

It should be noted that due to thermal energy considerations, the first brake units as just described need to avoid continuous operation of the solenoid valves, and the like, mounted in the first brake unit. Accordingly, this type of first brake unit is inappropriate for the long-term generation of the braking force. On the other hand, in the case of the motor-operated PKB 3 serving as the second brake unit, the motor is driven to a locked position in order to generate the braking force. Then, the actuating signal for the motor becomes inactive to stop the motor, while the braking force generated is still maintained. Hence, the PKB 3 has a slow response, but offers advantages since the PKB 3 has no problem related to thermal energy being produced even with long-term use, and has high energy efficiency.

(2) The foregoing first to fourth embodiments and sixth embodiment have described examples in which the initial pressure decrease amount γ in the initial pressure decrease mode is determined by the degree of accelerator opening and the elapse of time of the initial pressure decrease processing in Equations 1 and 3. However, the initial pressure decrease amount γ may be determined by considering an accelerator pedal operation speed and an accelerator pedal operation acceleration as the amount of accelerator pedal operation as shown in Equation 6.

$$\gamma = K \times \text{halt-maintenance braking force} \times (A1 \times \text{the degree of accelerator opening} + A2 \times \text{elapsed time} + A3 \times \text{accelerator pedal operation speed} + A4 \times \text{accelerator pedal operation acceleration}) \quad (6)$$

where, the halt-maintenance braking force is a braking force when the halted state of the vehicle is maintained in the halt-maintenance mode; and K and A1 to A4 are all proportionality constants that are preset.

Hence, the higher the halt-maintenance braking force, the larger the amount of accelerator pedal operation (the degree of accelerator opening, the operation speed, the operation acceleration), and further the greater the elapse of time of the initial pressure decrease, the more the initial pressure decrease amount γ is increased. In other words, it is possible to quickly decrease the braking force and to swiftly detect the actual movement direction of the vehicle.

(3) The foregoing first to fifth embodiments have described examples in which the halt-maintenance state of the vehicle before starting is realized by the first braking force generated by the hydraulic braking apparatus 2 serving as the first brake unit. However, the present invention is not limited to this, and even if the halted state of the vehicle is maintained by the second braking force generated by the motor-operated PKB 3 serving as the second brake unit, it is possible to perform the control that is executed after initiation of the starting assistance control, as in the case of each of the foregoing embodiments.

While the above description is of the preferred embodiments of the present invention, it should be appreciated that the invention may be modified, altered, or varied without deviating from the scope and fair meaning of the following claims.

What is claimed is:

1. An automatic brake device, comprising:
a braking-force application unit including a first brake unit that generates a first braking force on each wheel of a vehicle on the basis of a first actuating signal and that changes the first braking force to zero when output of the first actuating signal is stopped;
a second brake unit for generating a second braking force on at least one of the wheels of the vehicle on the basis of a second actuating signal, and for, when output of the second actuating signal is stopped, maintaining the second braking force at a value of an active state based on the second actuating signal issued before the output of the second actuating signal was stopped;
a starting preparation intention detecting unit that detects an operation input based on an intention of the driver to prepare for starting of the vehicle;
an intended direction detecting unit that detects an intended movement direction in which the driver intends to move the vehicle;
a movement direction detecting unit that detects an actual movement direction of the vehicle;
a brake control unit that, when the second braking force applied by the second brake unit maintains the vehicle in a halted state, switches the braking force applied to the wheels from the second braking force to the first braking force based on the detection result of said operation input and outputs the first actuating signal and the second actuating signal such that the first braking force is applied in accordance with a relationship between the detected intended movement direction and the actual movement direction;
an accelerator opening degree detecting unit for detecting an opening degree of an accelerator;
a vehicle speed obtaining unit or an acceleration obtaining unit for detecting a vehicle speed or an acceleration, respectively;
a target braking force decrease value determination unit for determining a target braking force decrease value based on the detected opening degree of the accelerator and the detected vehicle speed or the detected acceleration using a predetermined relationship between the opening degree of the accelerator and the vehicle speed or the acceleration and the target braking force decrease value.

2. The automatic brake device according to claim 1, wherein said starting preparation intention detecting unit detects any one of three operations, which are an actuation of a starting-preparation completion switch, shifting of a shift position of a transmission, and an actuation of a brake operation switch.

3. An automatic brake device, comprising:
a braking-force application unit including a first brake unit that generates a first braking force on each wheel of a vehicle on the basis of a first actuating signal and changes the first braking force to zero when output of the first actuating signal is stopped, and a second brake unit for generating a second braking force on at least one of the wheels of the vehicle on the basis of a second actuating signal, and for, when output of the second actuating signal is stopped, maintaining the second braking force at a value of an active state based on the second actuating signal issued before the output of the second actuating signal was stopped;

a starting intention detecting unit that detects an operation input based on an intention of the driver for the vehicle to start;

an intended direction detecting unit for detecting an intended movement direction in which the driver intends to move the vehicle;

a movement direction detecting unit for detecting an actual movement direction of the vehicle;

a brake control unit that, when the second braking force applied by the second brake unit maintains the vehicle in a halted state, removes the second braking force in the halted state in accordance with the operation input based on the detected intention of the driver to start, and further, when the actual movement direction of the vehicle differs from the intended movement direction, outputs the first actuating signal and the second actuating signal such that the first braking force is applied to the wheels when either a movement speed of the vehicle exceeds a predetermined speed, or when an amount of movement of the vehicle exceeds a predetermined value;

an accelerator opening degree detecting unit for detecting an opening degree of an accelerator;

a vehicle speed obtaining unit or an acceleration obtaining unit for detecting a vehicle speed or an acceleration, respectively;

a target braking force decrease value determination unit for determining a target braking force decrease value based on the detected opening degree of the accelerator and the detected vehicle speed or the detected acceleration using a predetermined relationship between the opening degree of the accelerator and the vehicle speed or the acceleration and the target braking force decrease value.

* * * * *